(12) United States Patent
Kajiura

(10) Patent No.: US 6,806,687 B2
(45) Date of Patent: Oct. 19, 2004

(54) VEHICLE MOTOR-GENERATOR APPARATUS UTILIZING SYNCHRONOUS MACHINE HAVING FIELD WINDING

(75) Inventor: Hiroaki Kajiura, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/761,270

(22) Filed: Jan. 22, 2004

(65) Prior Publication Data

US 2004/0150233 A1 Aug. 5, 2004

Related U.S. Application Data

(62) Division of application No. 10/020,983, filed on Dec. 19, 2001, now Pat. No. 6,713,888.

(30) Foreign Application Priority Data

| Dec. 19, 2000 | (JP) | 2000-385301 |
| Dec. 19, 2000 | (JP) | 2000-385314 |
| Dec. 19, 2000 | (JP) | 2000-385327 |
| Dec. 19, 2000 | (JP) | 2000-385336 |

(51) Int. Cl.⁷ ............................................. H02P 11/00
(52) U.S. Cl. ........................ 322/16; 322/14; 290/40 A; 290/40 F
(58) Field of Search ............... 290/40 A, 40 F, 290/40 R; 322/14, 16

(56) References Cited

U.S. PATENT DOCUMENTS

| 3,553,512 A | * | 1/1971 | Vetterman | 310/174 |
| 4,019,119 A | | 4/1977 | Naber | |
| 4,649,307 A | * | 3/1987 | Bech | 310/99 |
| 4,806,841 A | | 2/1989 | Lee et al. | |
| 4,956,598 A | | 9/1990 | Recker et al. | |
| 5,097,195 A | * | 3/1992 | Raad et al. | 322/10 |
| 5,172,784 A | | 12/1992 | Varela, Jr. | |

(List continued on next page.)

FOREIGN PATENT DOCUMENTS

| JP | 10-210722 A | 8/1988 |
| JP | 63-277499 A | 11/1988 |
| JP | 8-214470 A | 8/1996 |
| JP | 10-304633 A | 11/1998 |

*Primary Examiner*—Nicholas Ponomarenko
*Assistant Examiner*—Iraj A. Mohandesi
(74) *Attorney, Agent, or Firm*—Oliff & Berridge, PLC

(57) ABSTRACT

A vehicle motor-generator apparatus based on a field winding type of synchronous machine coupled to a power inverter and a battery, wherein the synchronous machine is controlled to operate as a motor to perform engine starting and thereafter be driven by the engine as an electrical generator, wherein during a short time interval at the commencement of engine starting, the armature winding of the synchronous machine is driven by a current such that magnetic flux is produced by the armature winding acting in the same direction as magnetic flux produced by the field winding, to thereby achieve increased torque during the time when maximum torque is required. In addition, the supplied field current is set at a maximum value during only an initial period when engine starting begins, until the first compression stroke of the engine has been completed, and thereafter set to a reduced value until the completion of engine starting, thereby reducing the amount temperature rise within the field winding during engine starting, while ensuring a sufficiently high value of initial torque.

4 Claims, 20 Drawing Sheets

U.S. PATENT DOCUMENTS

| | | |
|---|---|---|
| 5,255,175 A | 10/1993 | Uchino |
| 5,281,905 A | 1/1994 | Dhyanchand et al. |
| 5,309,081 A | 5/1994 | Shah et al. |
| 5,408,067 A | 4/1995 | Crouse |
| 5,483,435 A | 1/1996 | Uchino |
| 5,493,200 A | 2/1996 | Rozman et al. |
| 5,493,201 A | 2/1996 | Baker |
| 5,543,703 A | 8/1996 | Kusase et al. |
| 5,545,928 A | 8/1996 | Kotani |
| 5,646,510 A | 7/1997 | Kumar |
| 5,650,713 A | 7/1997 | Takeuchi et al. |
| 5,764,502 A | 6/1998 | Morgan et al. |
| 5,777,459 A | 7/1998 | Bansal et al. |
| 5,783,917 A | 7/1998 | Takekawa |
| 5,968,385 A | 10/1999 | Beeson et al. |
| 5,977,645 A | 11/1999 | Glennon |
| 5,998,880 A | 12/1999 | Kumar |
| 6,021,052 A | 2/2000 | Unger et al. |
| 6,067,243 A | 5/2000 | Suzuki et al. |
| 6,087,734 A * | 7/2000 | Maeda ............ 290/40 C |
| 6,157,175 A | 12/2000 | Morinigo et al. |
| 6,335,606 B1 | 1/2002 | Minagawa et al. |
| 6,384,567 B1 * | 5/2002 | Maeda ............ 290/40 C |
| 6,388,416 B1 | 5/2002 | Nakatani et al. |
| 6,400,107 B1 | 6/2002 | Nakatani et al. |
| 6,525,504 B1 | 2/2003 | Nygren et al. |

* cited by examiner

VEHICLE MOTOR-GENERATOR APPARATUS UTILIZING SYNCHRONOUS MACHINE HAVING FIELD WINDING

This application is a divisional of application Ser. No. 10/020,983, filed Dec. 19, 2001, now U.S. Pat. No. 6,713,888.

BACKGROUND OF THE INVENTION

1. Field of Invention

The present invention relates to a type of rotary electrical device of the type known as a synchronous machine, and in particular to a synchronous machine for use in a vehicle motor-generator apparatus that is controllable for selectively performing electric motor and electric power generation functions.

2. Description of Related Art

There have been proposals made in the prior art to use a synchronous machine of the type having a field winding in a motor-generator apparatus of a vehicle which is driven by an internal combustion engine (referred to in the following simply as the engine), so that a single rotary electrical device can be employed as a motor for the purpose of starting the engine and also as a generator (driven from the engine) for supplying electric power for charging the vehicle battery while the engine is running. Alternatively, such a vehicle motor-generator apparatus could also be utilized to provide electrically driven motive power when required, in the case of a hybrid type of motor vehicle.

However with such an apparatus, a worst-case operating condition occurs when the engine is halted immediately after the vehicle motor-generator apparatus has been running in a condition in which it is generate a substantial level of electric power (so that the synchronous machine is at a high temperature), and the engine is then restarted shortly after having been halted, so that a high level of current must be passed through the field winding of the synchronous machine under a condition of low speed of rotation. As a result, the maximum allowable temperature of the field winding may be exceeded, so that insulation breakdown or deterioration may occur. Such a condition may occur relatively frequently for example when the vehicle operates in an "idling halt" mode, whereby the engine is halted automatically under certain conditions.

It is necessary to design such a vehicle motor-generator apparatus such that the maximum allowable temperature of the field winding will not be exceeded even under the worst-case condition described above, when operating under the maximum anticipated ambient temperature. For that reason, it has been necessary for the size and weight of the synchronous machine used in such a vehicle motor-generator apparatus to be substantially greater than that of a conventional vehicle generator, having only an electric power generating function.

However it is undesirable to have to design such a vehicle motor-generator apparatus on the basis of thermal conditions which occur when the apparatus must supply a large amount of torque during a very short time interval, for the purpose of starting the vehicle engine, since in that case the thermal capacity of the vehicle motor-generator apparatus will be greatly in excess of that which is necessary during the majority of the time that the apparatus is operated, i.e., the configuration of the synchronous machine of the vehicle motor-generator apparatus will be excessively large and heavy.

Furthermore an important parameter of such a vehicle motor-generator apparatus is the time interval which must elapse, after the vehicle engine has been halted, between the issuance of an "engine start" command to the control section of the vehicle motor-generator apparatus (i.e., when the ignition switch of the vehicle is actuated) and the time point at which the engine then actually is started. In the prior art, the problem exists that the field winding of the synchronous machine of the vehicle motor-generator apparatus has a substantial amount of inductance, so that a significant amount of time is required for current build-up to occur in the field winding to achieve sufficient torque to initiate engine starting, and this increases the amount of time required to effect starting of the engine.

One objective of the present invention therefore is to provide a vehicle motor-generator apparatus whereby the size and weight of the synchronous machine used in the vehicle motor-generator apparatus can be reduced by comparison with the prior art, while a further objective is to reduce the amount of time required to perform engine starting, by such a vehicle motor-generator apparatus.

Moreover, in Japanese patent HEI 8-214470 a field winding type of synchronous machine is described whereby a phase-advanced AC current, supplied from a power inverter (i.e., a DC-AC and AC-DC converter), is caused to flow in the armature winding of the synchronous machine when the synchronous machine operates to generate electric power. This enables a higher level of generated electric power to be attained when the synchronous machine is driven at a low speed of rotation, by comparison with a conventional type of vehicle generator apparatus which applies only DC rectification to the AC output voltage from the synchronous machine.

Furthermore, such a method can also enable increased efficiency of electric power generation to be achieved when the synchronous machine is driven at a high speed of rotation, by utilizing field control.

However in the prior art it has been necessary to provide such devices as power MOS transistors as switching elements, for supplying the phase-advanced current to the armature winding of the synchronous machine. As a result, the circuit cost becomes higher than in the case of an apparatus which uses only diode rectifiers. Furthermore due to the use of phase-advanced current supply to the armature winding of the synchronous machine, a lowering of efficiency occurs because of increased resistive losses in the armature winding and increased generation of heat, so that the requirements for cooling the armature winding become more stringent.

Furthermore in Japanese patent HEI 10-30463, a synchronous machine is disclosed which is of the type having a field winding and having permanent magnets embedded in the rotor, whereby the effective magnetic flux in the rotor can be controlled such as to eliminate the need to produce a weak flow of current in the armature winding when the synchronous machine is operated at a high speed of rotation, i.e., a flow of current for the purpose of preventing an excessively high level of voltage being generated due to the magnetic fields of the permanent magnets under such a condition of high speed of rotation. Furthermore, with that synchronous machine, even if armature current control becomes ineffective when the synchronous machine is operated at a high speed of rotation, the magnetic flux of the permanent magnets is shunted in such a way that high stability is ensured. That type of synchronous machine will be referred to in the following as a combination permanent magnet and field winding synchronous machine of magnetic shunt type.

However with such a prior art combination permanent magnet and field winding synchronous machine of magnetic shunt type, since the magnetic circuit is complex, there is a high degree of magnetic reluctance in the magnetic circuit, so that the device becomes large in scale in relation to its electric power generating capability.

It is therefore another objective of the present invention to overcome the above disadvantage, by providing a combination permanent magnet and field winding synchronous machine of magnetic shunt type, for use in a vehicle motor-generator apparatus, which maintains a high degree of suppression of the adverse effects of magnetic flux during operation at a high speed of rotation, while the levels of generated torque and output power are increased in relation to the size of the machine. The suitability of such a synchronous machine for use in a vehicle motor-generator apparatus can thereby be increased.

SUMMARY OF THE INVENTION

With the present invention, the various objectives summarized above are attained as follows.

According to a first aspect, the invention provides a vehicle motor-generator apparatus comprising a field winding type of synchronous machine, an AC-to-DC and DC-to-AC power converter which converts the DC voltage of a battery of the vehicle to an AC voltage, to thereby supply an AC armature current to an armature winding of the synchronous machine, a field current supply circuit for supplying a field current to the field winding of the synchronous machine, to produce a field winding magnetic flux, and a control circuit for controlling the AC-to-DC and DC-to-AC power converter and the field winding circuit, wherein while the synchronous machine is being operated as an electric motor to perform starting of the engine of the vehicle, the AC-to-DC and DC-to-AC power converter supplies to the armature winding the armature current as a current having a component which forms a magnetic flux in the same direction as that of the field winding magnetic flux. The rotor of the synchronous machine may be provided only with a field winding, or may be of a type which is provided with both a field winding and a plurality of permanent magnets fixedly attached to the rotor, arranged such as to produce magnetic fields of successively alternating polarity around the periphery of the rotor.

Such an apparatus may be further configured such that during an initial period of an engine start-up interval, the AC-to-DC and DC-to-AC power converter supplies to the armature winding the armature current having a component which forms a magnetic flux in the same direction as that of the field winding magnetic flux, and thereafter operates to set the phase of the armature current such as to enhance the generation of torque by the synchronous machine for starting the engine.

Alternatively, such an apparatus can be configured such that when the engine is being started, prior to current being supplied to the field winding, the armature winding is supplied with an armature current such that an armature current-induced magnetic flux is formed which is oriented at approximately the same angular position as that of the field winding magnetic flux.

According to another aspect of the apparatus, designating a maximum allowable temperature of the rotor of the synchronous machine as Tmax, a maximum temperature that will be attained by the rotor during electric power generation operation as Tgmax, and a thermal capacity of the rotor as Q, and also designating T as the duration of an engine starting operation, the resistance of the field winding as r, and the field current as i, the control circuit is configured to limit the field current (during both the electric power generating mode and the electric motor mode, i.e., engine starting) to a value such that (Tgmax+(i2.r.t)/Q) is lower than the temperature value Tmax, preferably by an amount that is within the range 20° C. to 40° C. It can thereby be ensured that the insulation of the field winding of the synchronous machine will not be destroyed due to operation at an excessive temperature, while reducing the size and weight of the synchronous machine to the greatest possible degree, by enabling reduction of the value of Q.

According to another aspect, the control circuit can be configured to derive an electrical quantity relating to an average value of the field current and an average value of the armature current during a predetermined time interval which extends up to the commencement of an engine starting operation effected by the motor-generator apparatus, and to limit the field current or the armature current to a value that is determined based upon the electrical quantity, during the electric power generation mode. The maximum amount of field current which can be supplied to the rotor of the synchronous machine during engine starting operation must be, as described above, limited such as to ensure that the rotor temperature does not rise to a level at which destruction of the insulation material of the field winding may occur. For any particular value of field current that is supplied during engine starting, the level to which the rotor temperature will rise (by the end of the engine starting interval) is based on the rotor temperature at the start of the engine starting operation. That initial rotor temperature is strongly affected by the average values of field current and armature current which were flowing during electric power generation operation immediately prior to commencing the engine starting operation. With this aspect of the invention, these average values of current are utilized as a basis for determining the maximum value of field current that can be supplied during the engine starting operation (and hence, the level of torque that can be generated by the synchronous machine during the engine starting operation).

Alternatively, the control circuit can be configured to derive an electrical quantity relating to ambient temperature, and to control the field current, during electric power generation operation or during engine starting operation, to a value which is based upon that electrical quantity. Since the temperature which the rotor will have attained by the end of the engine starting interval is strongly affected by the rotor temperature at the start of the engine starting operation, it will be understood that such a form of control of the field current can also enable the value of field current supplied during the engine starting operation to be increased, consistent with ensuring that thermal damage to the field winding insulation material will not occur.

The invention therefore discloses various means whereby the size and weight of the synchronous machine of such a vehicle motor-generator apparatus can be minimized, consistent with preventing destruction of the field winding insulation and with achieving satisfactory engine starting and electric power generating performance.

According to another aspect, in which the rotor of the synchronous machine has a rotor core with the field winding wound thereon, the control circuit is configured to function during an engine starting operation such as to control the field current and the armature current in a manner whereby magnetic saturation occurs in a magnetic circuit which passes through the rotor core, and to control the value of a field magnetic force Ff (i.e., the product of the field current by the number of turns of the field winding) to a higher value than an armature magnetic force Fa (i.e., the product of the armature current by a number of turns of the armature winding). In that way it becomes possible to reduce the electrical losses which occur during the electric power generating mode of operation, and thereby achieve increased efficiency.

According to another aspect, one or more layers of thermally conductive film are disposed between layers of the field winding, extending along a winding direction of the field winding and in contact with the rotor core. In that way, heat generated within the field winding can be efficiently transferred to the rotor core and thereby rapidly dissipated, thereby enabling a higher level of field current to be applied during engine starting operation, with resultant increased torque. Thus, the rotor (and hence, the overall synchronous machine) can be made smaller and lighter than in the prior art.

According to another aspect, the control circuit is configured such that during a predetermined initial period of an engine starting interval, the control circuit supplies a high level of field current to the field winding (e.g., with the aforementioned duty ratio at its maximum value of 100%), in order go generate sufficient torque to overcome the initial static friction of the engine and rotate the engine through the first compression cycles, and thereafter supplies the field current with a reduced value of duty ratio during the remaining part of the engine starting interval. Preferably, this is performed such that the aforementioned initial period of supplying the maximum level of field current is of sufficient duration to encompass at least the first compression stroke of the engine, as it is rotated by the synchronous machine.

After that initial period, the level of field current is reduced to a level which will produce sufficient torque to continue rotation of the engine, and this level of field current is maintained until engine starting has been completed. In that way, it becomes possible to use a smaller size of synchronous machine to perform engine starting, by comparison with the prior art in which a large amount of torque (sufficient to overcome the static friction forces and rotate the engine through the initial compression strokes) is continuously applied during the entire engine starting interval. With such a prior art apparatus, due to considerations of the heat generated in the drive motor when continuously supplying a high level of field current during a relatively long period of time, it is necessary to use a large and heavy device to perform the starter motor function. However with the present invention, that problem can be overcome as described above. After the level of field current has been reduced, that level can be continuously supplied during a relatively long interval, with a minimal amount of heat being generated in the field winding, until it is ensured that engine starting has been achieved. In that way, the performance requirements for the synchronous machine, when functioning as an engine starter motor, can be substantially reduced, so that a small and light device can be utilized.

According to another aspect, the invention provides a vehicle motor-generator apparatus based on a field winding type of synchronous machine, in which the rotor has a rotor core of cylindrical form, with an even number of permanent magnets respectively retained in an even number of magnet accommodation apertures each formed extending along an axial direction in the stator core, with an even number of field poles of the permanent magnets being arranged successively alternating in polarity around the outer periphery of the stator core. The rotor core further includes magnetic shunt members, i.e. pins formed of a soft magnetic material, inserted in respective apertures extending along the axial direction of the rotor core, for shunting the magnetic fields of the permanent magnets, and disposed such that the magnetic flux of the field winding passes along these pins, in the axial direction of the rotor. The synchronous machine further includes a yoke member, disposed at the inner periphery of the rotor core, which acts in conjunction with the rotor core and the magnetic shunt members (pins) to form a flow path for the magnetic flux produced by the field winding. It is a basic feature of such a synchronous machine that each of the permanent magnets has at least a portion thereof which is positioned radially inward in relation to the magnetic shunt members, and that the rotor core has a magnetic path which extends from an external peripheral position between two circumferentially adjacent ones of the 90field poles and between two adjacent ones of the permanent magnets to a position which is radially inward from the permanent magnets.

As a result, the synchronous machine can generate reluctance torque under a condition in which saturation of magnetic paths within the rotor core occurs under a condition of high levels of current flow in the armature and field windings.

According to another aspect, the vehicle motor-generator apparatus is of a type in which a phase-advanced AC current is supplied to the armature winding of the synchronous machine during electric power generation operation, to increase the level of electric power that can be produced., i.e., with the phase-advanced current being advanced in phase by a predetermined phase angle with respect to the AC voltage produced from the armature winding as a result of relative motion of the armature winding through the magnetic field produced by the rotor. With the present invention, the synchronous machine is formed with a rotor-side iron core portion (i.e., providing a magnetic path, within the rotor, for the magnetic flux induced by current flow through the field winding) which has a smaller value of magnetic reluctance in a direction that is at right angles to the direction of that magnetic flux than in the direction of the magnetic flux.

As a result, the electrical generation power factor of the synchronous machine is increased, i.e., the total amount of current which flows through the armature winding (for a specific level of generated electric power) is reduced, by comparison with prior art types of apparatus which utilize the method of supplying a phase-advanced current to the armature winding. Hence, the scale of the synchronous machine, as regards electric power generation requirements, can be reduced, and manufacturing costs lowered.

DETAILED DESCRIPTION OF PREFERRED EMBODIMENTS

Figure 1:
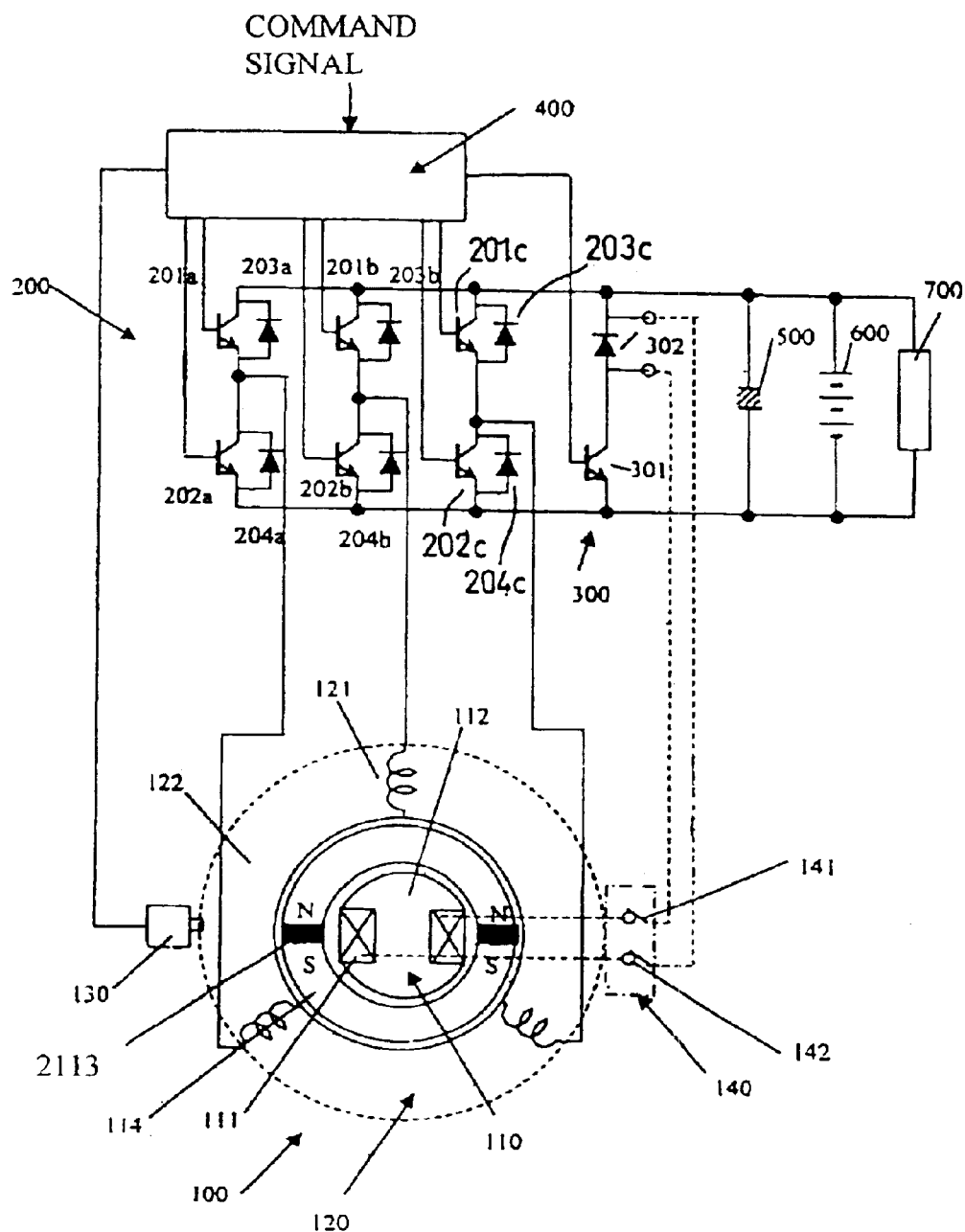
FIG. 1 shows the overall configuration of a first embodiment of a vehicle motor-generator apparatus according to the present invention.

FIG. 1 shows the overall configuration of a first embodiment of a vehicle motor-generator apparatus according to the present invention. This is based on a synchronous machine 100 functioning as a generator-motor, which has both permanent magnets and a field winding. The synchronous machine 100 has a rotor 110 disposed within the inner periphery of a stator 120. The rotor 110 has a first rotor core 112 with a field winding 111 wound thereon, and a second rotor core 114 mounted coaxially with the first rotor core 112 such as to be incapable of rotation with respect to the first rotor core 112, and having permanent magnets 2113 mounted thereon. The rotor 110 is mechanically coupled to the crankshaft of a vehicle engine (not shown in the drawings) by for example a drive belt.

The stator 120 has a stator core 122 with an inner periphery which is separated by a fixed gap from the outer periphery of the second rotor core 114, and which has a 3-phase armature winding 121 wound thereon. The synchronous machine 100 has a rotation sensor 130 for detecting the rotational position of the rotor 110, and a feeder section 140 formed of brushes 141 and slip rings 142, for supplying DC electric power to the field winding 111.

Numeral 200 designates an AC-to-DC and DC-to-AC electrical power converter, referred to in the following simply as the inverter 200, which receives 3-phase AC power from the armature winding 121 of the synchronous machine 100 when the vehicle motor-generator apparatus operates the synchronous machine in an electric generator mode, and supplies 3-phase AC power to the armature winding 121 when the synchronous machine is operated in an electric motor mode, to perform engine starting. The inverter 200 is formed of transistors 201*a* to 201*c* and 202*a* to 202*c*, and diodes 203*a* to 203*c* and 204*a* to 204*c*, and operates in conjunction with a smoothing capacitor (i.e., capacitor) 500 to supply a DC charging voltage to the battery 600 (during operation in the electric generator mode) and to use the battery 600 as a DC power source (during operation in the electric motor mode).

A field current supply circuit 300 is formed of a transistor 301 and diode 302, and supplies a field current via the feeder 140 to the field winding 111, with the field current being controlled by varying the duty ratio of ON/OFF switching operation of the transistor 301. A controller 400 controls the inverter 200 and the field current supply circuit 300, based on externally supplied command signals and signals produced from the rotation position sensor 130. The capacitor 500, vehicle battery 500 and electrical load 700 are connected to the inverter 200 and field current supply circuit 300 as shown.

Figure 2:
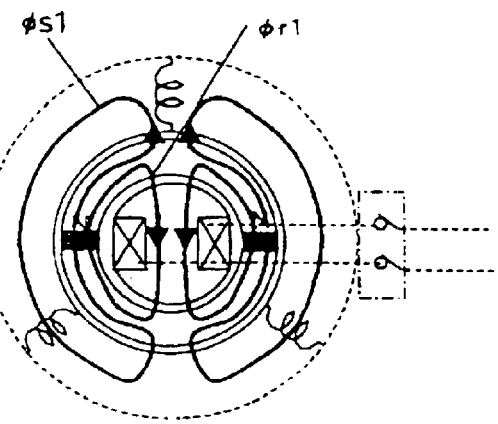
FIG. 2 is a diagram illustrating a flow of magnetic flux in a field magnetic circuit path within a rotor of a synchronous machine of the first embodiment, under a condition in which no current flows.

FIG. 2 illustrates the magnetic circuit of magnetic flux which flows in the synchronous machine 100, under the condition in which no current is passed through the field winding 111 from the field current supply circuit 300. In this case, the permanent magnets 2113 produce a magnetic flux fs1 which flows in the stator core 122 side and magnetic flux fr1 which flows in the first rotor core 112 side. This condition will be referred to in the following as the condition A.

Figure 3:
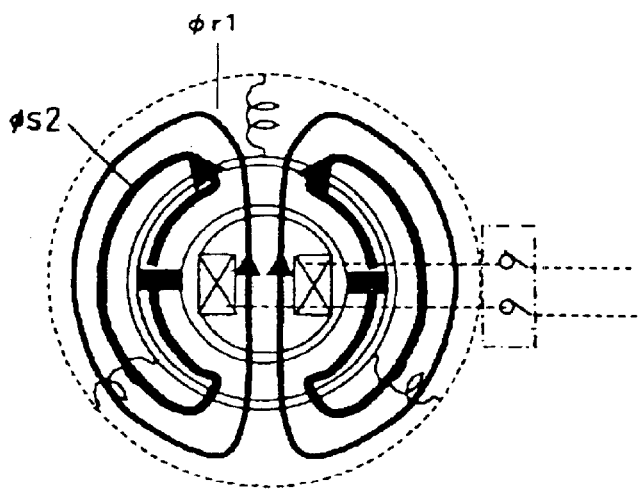
FIG. 3 is a diagram illustrating a flow of magnetic flux in a field magnetic circuit path within the rotor, under a condition in which current flow occurs.

FIG. 3 shows the magnetic flux which flows when current is passed by the field current supply circuit 300 through the field winding 111. In this case, due to that field current flow, the magnetic flux of the permanent magnets 2113 flows through all of the stator core 122, as the magnetic flux fs2 (>sf1). At the same time, also due to the field current, a magnetic flux fr2 is formed in the opposite direction to the magnetic flux fr1. This condition will be referred to in the following as the condition B. In the condition B, the magnetic flux which flows in the stator core 122 is fs2+fr2, and the electromagnetic interaction between that magnetic flux and the current which flows in the armature winding 121 produces torque.

Figure 4:
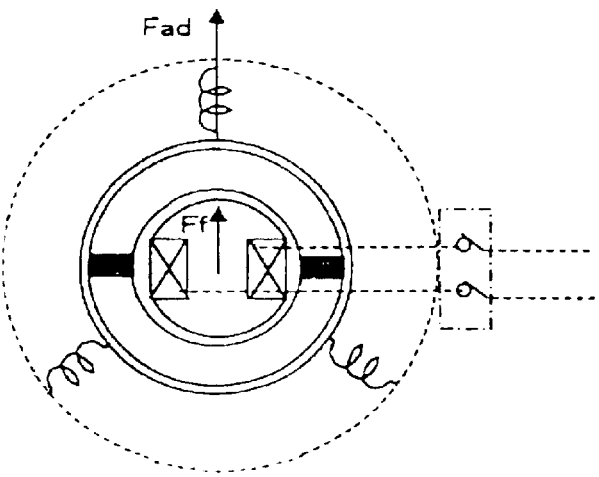
FIG. 4 is a diagram illustrating magnetization directions in the synchronous machine of the first embodiment, prior to an engine start operation.

When engine starting by the synchronous machine 100 begins, a signal is sent from the controller 400 whereby the field current supply circuit 300 supplies field current to the field winding 111 to thereby effect a change from the condition A to the condition B. However due to the large inductance of the field winding 111, a time of approximately 0.2 second is required for the field winding 111 to change from condition A to condition B and thereby produce a magnetizing force Ff. With this embodiment, at the same time that field current is supplied to the field winding 111, a signal is produced from the controller 400 which causes armature current to be supplied to the armature winding 121, and thereby produce magnetic flux in the same direction as the magnetic flux which is produced by the field current flowing in the field winding 111. The effective level of this armature current is determined by the duty ratio of ON/OFF switching control which is performed by the inverter 200. As a result, as indicated in FIG. 4, the armature winding 121 generates a magnetizing force Fad, acting in the same direction as the magnetizing force Ff of the field winding 111.

Hence, since a magnetic flux acting in the same direction as the magnetizing force Ff of the field winding 111 is rapidly established, the time required to change from the condition A to the condition B can be shortened. In order to make the level of armature current flow at this time as large as possible, the duty ratio of control of the armature current by the inverter 200 should be made as high as possible.

After a predetermined time interval has elapsed (i.e., a time interval sufficiently long that it can be assumed that the field magnetic flux has reached a predetermined suitable level) a signal is sent from the controller 400 whereby the phase of the armature current that flows in the armature winding 121 is gradually changed to a phase angle whereby maximum torque is generated.

In that way, the time required to perform engine starting can be shortened.

Alternative Configurations

With the embodiment described above, when engine starting is performed, the beginning of supplying the field current and the beginning of supplying the armature current both occur at the same time. However it would be equally possible to modify the above embodiment such that the start of supplying the armature current begins prior to the start of supplying the field current. In that case, when engine starting is to begin, the maximum possible amount of armature current is passed, to produce a magnetizing force Fad acting in the same direction as the magnetizing force Ff of the field winding 111, with magnetic energy thereby being supplied from the armature winding to be stored in the magnetic circuit. When this has been completed, or has almost been completed, current is supplied to the field winding 111. In that way, it becomes possible to prevent overheating of the field winding 111, when engine starting is performed. Alternatively stated, this enables the overall size and weight of the synchronous machine to be reduced, since a rotor of smaller mass can be utilized.

Furthermore, although the above embodiment utilizes a synchronous machine of the type having both permanent magnets and a field winding, with a magnetic field shunt configuration, the invention is applicable to field winding types of synchronous machines in general.

Moreover the invention could be applied to a synchronous machine of the type having both permanent magnets and a field winding, of the permanent magnet magnetic field shunt form, and having a static field winding configuration, i.e., with a magnetic path shunt member disposed along the axial direction of the second rotor core 114, so that magnetic flux is led by that shunt member into the first rotor core 112, while a disk-shaped field core member is provided between the first rotor core 112 and the second rotor core 114, with the magnetic field shunt path being configured to extend from that field core member to the inner peripheral face of the second rotor core 114, and with an end portion of that yoke member having a field winding wound thereon.

Second Embodiment

Figure 5:
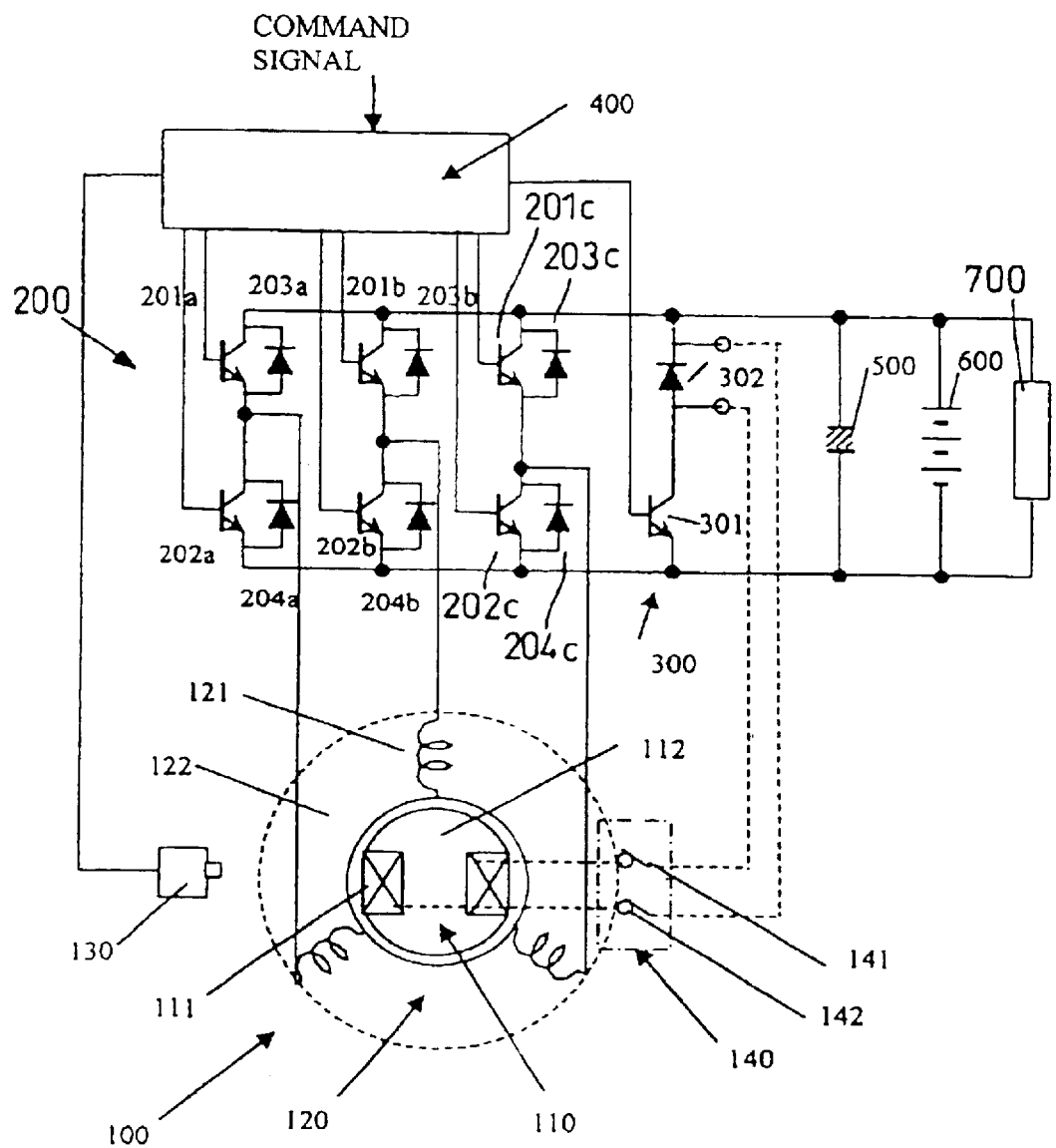
FIG. 5 shows the overall configuration of a second embodiment of a vehicle motor-generator apparatus, based on a field winding type of synchronous machine.

A second embodiment will be described, whose overall configuration is as shown in FIG. 5. This configuration differs from that of the preceding embodiment only with respect to the rotor 110 of the synchronous machine 2000, which is not provided with permanent magnets. However it should be understood that the principles described in the following would also apply to a synchronous machine having a field winding and permanent magnets mounted on the rotor.

Figure 11:
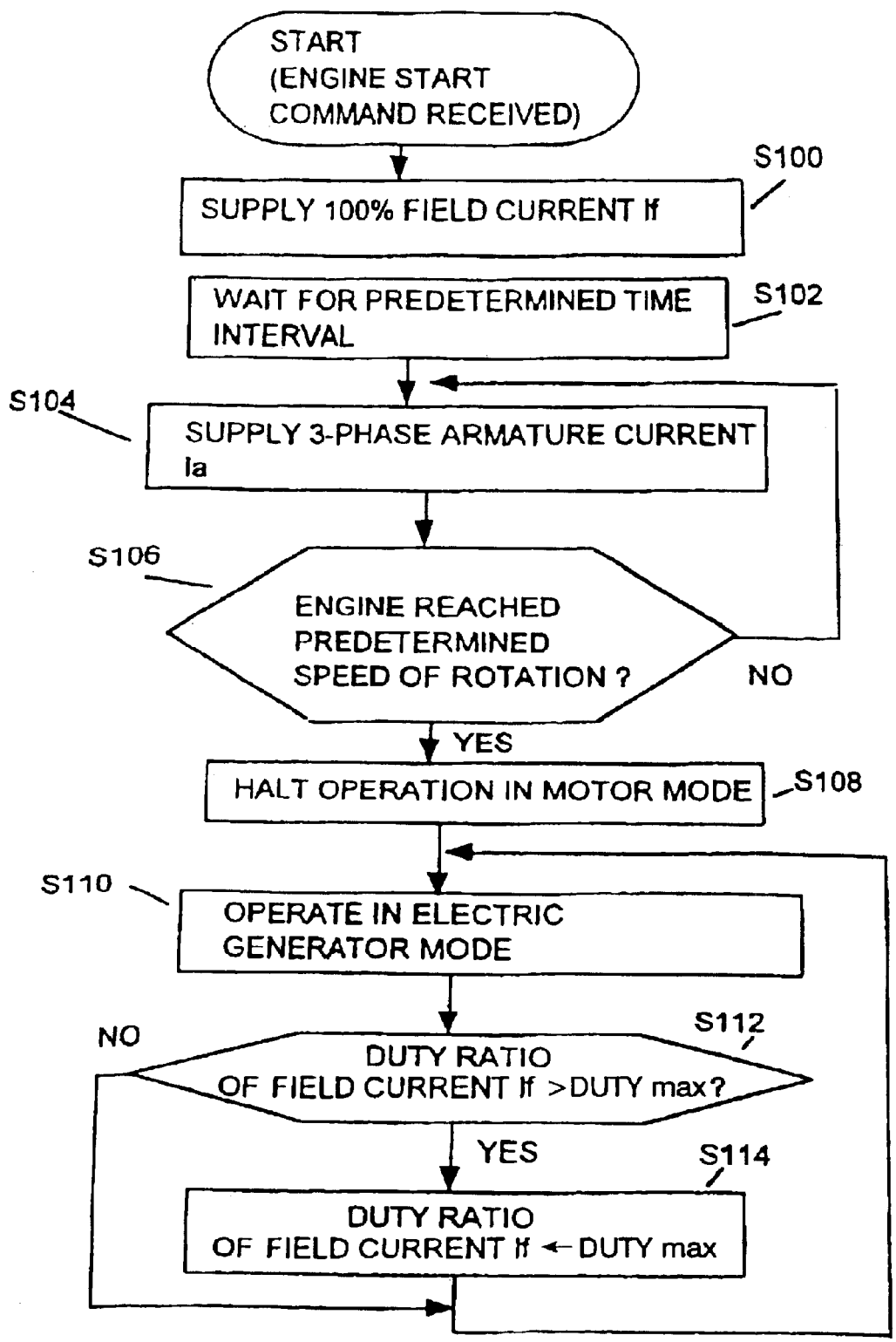
FIG. 11 is a flow diagram of the control operation for the synchronous machine shown in FIG. 5.

The operation of this embodiment with respect to engine starting will be described referring to FIG. 11. Firstly, when engine starting is to be executed by the synchronous machine 2000, power is supplied from the field current supply circuit 300 to the field winding 111, and a field magnetizing force Ff is thereby generated whereby the rotor 110 is magnetized and a field flux ff is thereby induced in the stator 120. Since the field winding 111 has a high value of inductance, a certain amount of time is required before the field current increases to a requisite level. It should be noted that it might be possible to omit the step S102, to shorten the engine starting time duration.

Next, the transistors 201 to 203 of the inverter 200 are switched successively, to produce 3-phase current flow in the armature winding 121. As a result, a magnetizing force Fa is generated in the armature winding 121, so that the synchronous machine 2000 is acted on by a combined magnetizing force Fg which is the vector sum Ff.Fa of field magnetizing force Ff and the armature magnetizing force Fa. A combined magnetic flux fg is thereby generated, so that torque is produced and the engine is started. When it is detected that the engine speed of rotation has reached a first predetermined value, the flow of armature current is halted, and the engine starting operation is thereby terminated. Thereafter, when it is determined that the engine has reached a second predetermined speed of rotation, the control circuit 400 begins to control the switching of the transistors 201a to 203c such that electric power generation operation is begun, with a 3-phase AC voltage supply produced from the armature winding of the synchronous machine being rectified to obtain a DC voltage, for charging the battery 600 and supplying the electrical load 700.

Figure 6:
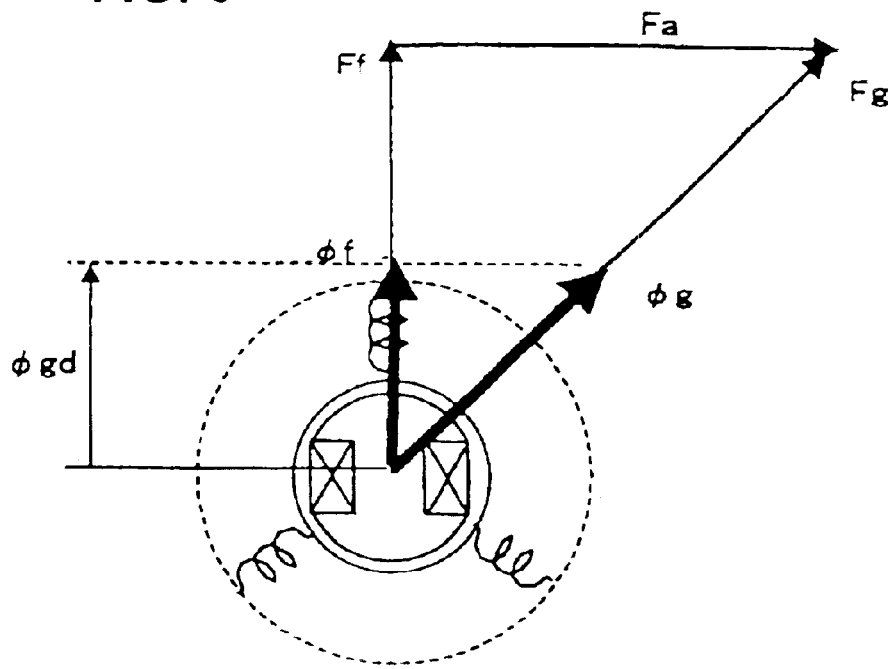
FIG. 6 is a vector diagram showing the magnetizing force condition in the case of non-saturation of the magnetic circuit of a field winding type of synchronous machine.

It is a feature of this embodiment that a method of increasing the engine starting torque is utilized, as described in the following. FIG. 6 is a vector diagram showing a condition of a phase difference of 90 degrees between Ff and Fa, in an unsaturated condition of the magnetic circuit. In that condition of unsaturation, the combined magnetic flux fg is increased due to an increase of the magnetic flux ff, and the magnetic flux ff becomes the field magnetizing force directional component fgd of the combined magnetic flux fg.

The generated torque is determined by the vector product of the field magnetizing force directional component fgd (i.e., which is equal to the field magnetic flux ff) of the combined magnetic flux fg and the armature magnetizing force Fa.

The above describes the condition when there is no saturation of the magnetic circuit. This embodiment uses the magnetic circuit in such an unsaturated condition, when a large amount of electrical power is generated, whereas while engine starting operation is being executed, the magnetic circuit is set in a magnetically saturated condition.

Figure 8:
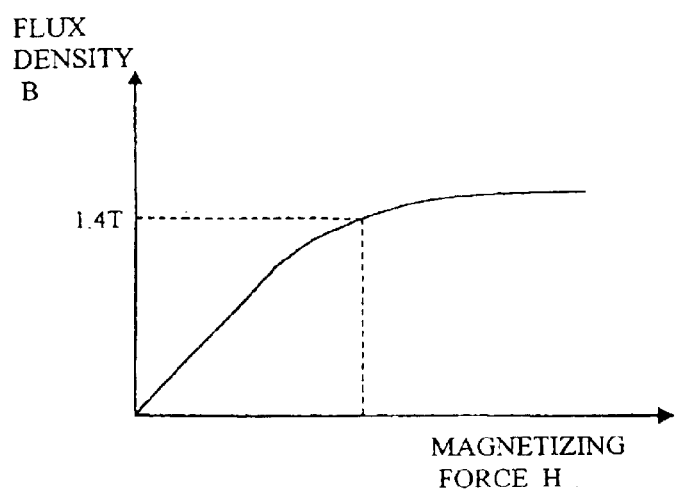
FIG. 8 is a B-H curve showing the magnetic characteristics of magnetic material of a magnetic circuit in the synchronous machine shown in FIG. 5.

FIG. 8 shows the B-H curve of the material used in the rotor parts such as the rotor core. As shown, this has a region of non-linearity of the magnetic saturation characteristic, i.e., a region in which the magnetic flux density does not increase in proportion to an increase of the magnetizing force H. The maximum amount of magnetic flux B is thereby approximately 1.4T.

Figure 7:
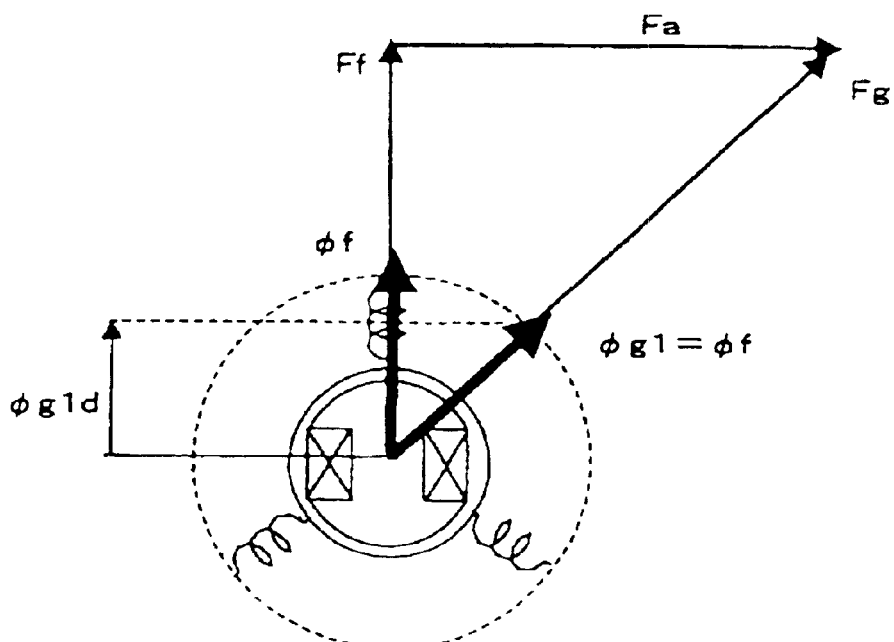
FIG. 7 is a vector diagram showing the magnetizing force condition in the case of saturation of the magnetic circuit of a field winding type of synchronous machine.

FIG. 7 illustrates the magnetic circuit in the saturated condition. In this case, the combined magnetic flux fg1 does not increase, and the field magnetizing force directional component fg1d of the combined magnetic flux fg1 becomes smaller than ff. Even if the field magnetic flux ff is increased, due to the saturation of the magnetic circuit there will not be a corresponding increase in the field magnetizing force directional component fgd of the combined magnetic flux fg1. Irrespective of the saturation of the magnetic circuit, since the field magnetic flux ff can increase and since the torque is determined by the vector product of the field magnetizing force directional component fgd and the armature magnetizing force Fa, the torque is increased, with this embodiment, by making the phase angle q between the combined magnetic flux fg and the field magnetizing force Ff become small. The field magnetizing force directional component fg1d of the combined magnetic flux fg1 can thereby be made large, so that a higher level of torque can be achieved.

Figure 9:
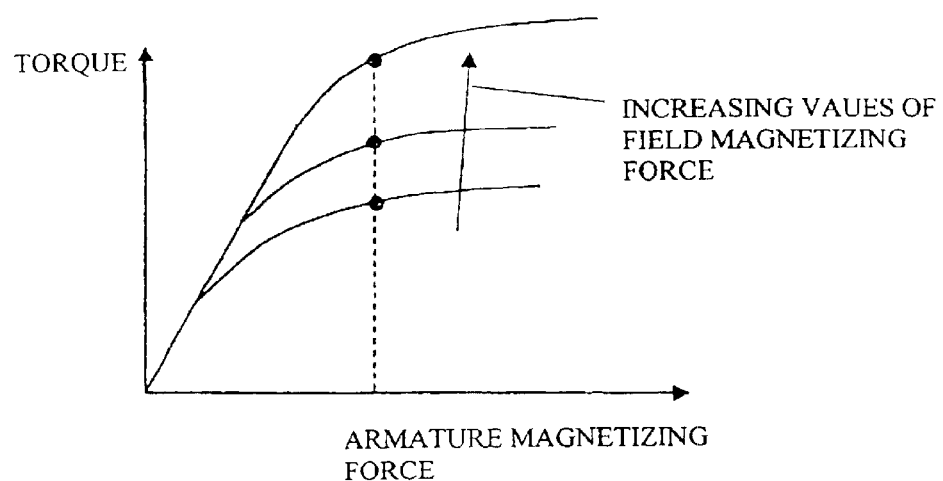
FIG. 9 is a graph showing the variation characteristics of torque and armature magnetizing force with respect to changes in field current, for the synchronous machine shown in FIG. 5.

That is to say, even if the amount of field magnetic flux ff does not increase, since the field magnetizing force Ff becomes larger than the armature magnetizing force Fa, the field magnetizing force directional component fgd (whose direction is at right angles to that of the armature magnetizing force Fa) is increased, so that the generated torque is thereby increased. FIG. 9 is a graph showing the relation between variation of the field magnetizing force Ff and the armature magnetizing force and the generated torque.

Figure 10:
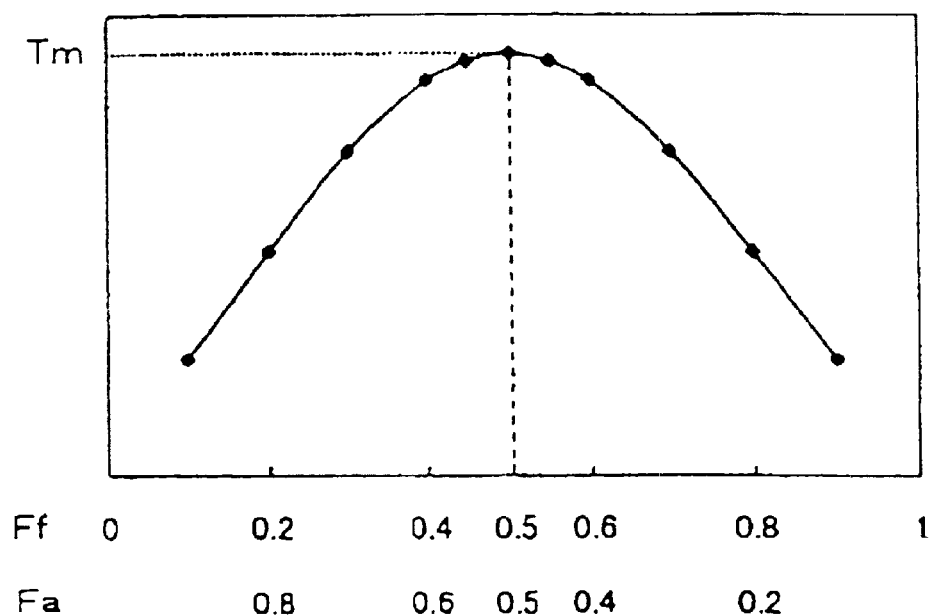
FIG. 10 is a graph showing the variation characteristics of torque with respect to field magnetizing force and armature magnetizing force, for the synchronous machine shown in FIG. 5.

In a model in which there is magnetic saturation, that is to say, the scalar sum (Ff+Fa) of the magnetizing forces is fixed in value, the relation between changes in the field magnetizing force Ff and the armature magnetizing force Fa is as illustrated in FIG. 10. In FIG. 10, Tm is the generated torque when magnetic saturation does not occur. As can be understood from FIG. 10, these magnetizing forces are most effectively utilized in generating torque when the field magnetizing force Ff and the armature magnetizing force Fa are equal to one another.

That is to say, with a saturated-core field winding type of synchronous machine, as the field magnetizing force Ff becomes greater than the armature magnetizing force Fa, the amount of generated torque will increase irrespective of the saturation of the magnetic circuit. When such a synchronous machine is applied in engine starting, the transistor 301 of the field current supply circuit 300 is set in the fully ON state so that the terminal voltage of the battery 600 causes a field current to flow which has a maximum value that is substantially determined by the resistance of the field winding 111 and the voltage drop across the transistor 301. Hence, the current-carrying capacity of the transistor 301 must be selected based on considerations of the current that will flow when the resistance of the field winding 111 is at its lowest anticipated value, i.e., the resistance when the field winding 111 is at its lowest anticipated temperature.

While the synchronous machine 2000 is being used for electric power generation after the engine has started, ON/OFF switching control of the transistor 301 is repetitively performed to control the effective level of field current and thereby control the generated armature voltage, such that the battery 600 will attain its rated voltage.

With this embodiment, designating the maximum operating temperature of the insulation film of the field winding 111 as Tmax, it must be ensured that the level of field current that is passed during electric power generating operation by the synchronous machine is limited to a value, determined by a specific value (referred to herein as DUTYmax) of duty ratio of ON/OFF switching of field current, whereby the temperature of the field winding 111 does not exceed a temperature value that is obtained by subtracting an amount ΔT from Tmax. Here, ΔT is a temperature increase amount that is essentially determined by thermal capacity of the field winding 111, its electrical insulation and the rotor core 2120 (i.e., thermal capacity of the rotor) and thermal capacity Q of the field winding 111 when engine starting is performed.

If the above condition is satisfied, then it can be reliably ensured that destruction of the insulation film of the field winding 111 can be prevented while providing the maximum practicable level of generated electric power, even under a condition whereby the engine is stopped immediately after electric power generating has been halted, and the engine is then restarted immediately thereafter (i.e., the worst-case thermal condition of operation for the synchronous machine). With this embodiment, the limitation of the generated electric power is performed based on the field current of the synchronous machine, and this is appropriate since a reduction of the field current directly results in a lowering of the temperature of the field winding.

Thermal specifications for the rotor of the synchronous machine, with this embodiment, are determined as follows.

The maximum allowable temperature for the rotor will be designated as Tmax, the maximum temperature that can be attained by the rotor during electric power generation operation as Tgmax, and thermal capacity of the rotor as Q. Thermal capacity of the rotor is substantially determined as the sum of the specific heat of the rotor core material multiplied by the rotor mass and the specific heat of the material of the field winding multiplied by its mass. In addition, if the synchronous machine is of a type which also incorporates permanent magnets as described for the preceding embodiment, then thermal capacity of the permanent magnets must also be added, to obtain thermal capacity Q of the rotor. In addition, the time interval during which field current is passed while engine starting is performed will be designated as T, the electrical resistance of the field winding as r, and the field current as i. In that case, with this embodiment, the maximum value of the field current i (in practice, the maximum field current that is supplied during engine starting operation, i.e., with the duty ratio used in switching ON/OFF control of the field current as described above being at its highest value, such as 100%) is controlled, and the values of Q, r, T and Tgmax respectively predetermined, such that the temperature value:

$$(Tgmax+(i^2.r.T)/Q)$$

is lower than the temperature Tmax.

Preferably it is ensured that $(Tgmax+(i^2.r.T)/Q)$ is kept lower than the temperature Tmax by an amount which is within the range 20~40° C.

In that way, this embodiment enables thermal damage to the insulation film of the field winding due to be avoided, for a field winding type of synchronous machine that is used for both engine starting and for electric power generation in a vehicle, while enabling the size and weight of such a synchronous machine (which are essentially determined by the magnitude of Q) to be reduced.

Alternative Configuration

With the second embodiment described above, thermal destruction of the insulation film of the field winding is avoided by appropriately limiting the level of field current which flows during electric power generating operation, while ensuring that sufficient levels of both engine starting and electric power generation performance are achieved. However the actual temperature of the rotor of such a synchronous machine at a time point immediately prior to starting the engine will depend upon the respective levels of field current and armature current which flow during a predetermined time interval which extends up to the point at which engine starting begins, and upon the ambient temperature.

Figure 12:
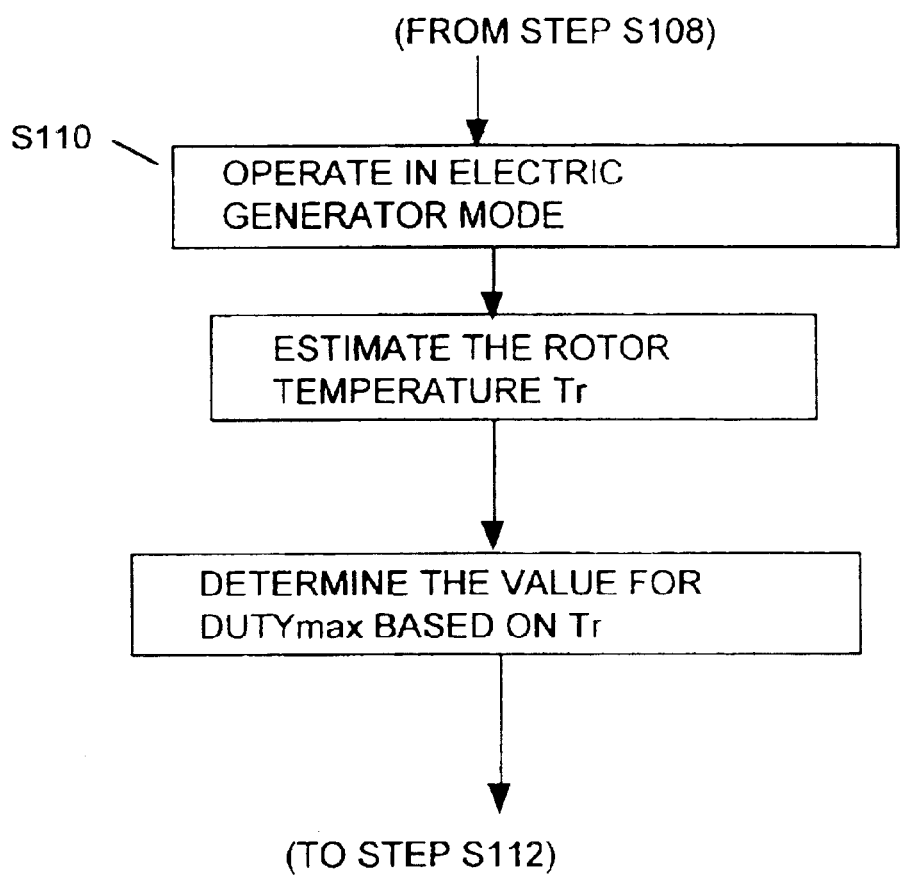
FIG. 12 is a flow diagram of control operation applied to the of synchronous machine shown in FIG. 5.

With an alternative form of the second embodiment therefore, during a predetermined time interval that extends up to the point at which starting of the engine is commenced (i.e., the ignition switch of the vehicle is actuated to thereby supply an "engine start" command signal to the control circuit 400), the average field current, the average armature current and the ambient temperature, are measured, and these measured values are used in combination to estimate the temperature (designated as Tr) which the rotor will have attained at the point when engine starting is to begin. The aforementioned maximum value of duty ratio DUTYmax that will be applied in ON/OFF switching control of the transistor 301 as described hereinabove to control the level of field current during electric generation operation is then obtained from an internal memory map (not shown in the drawings), based on the estimated temperature value Tr. For example, the higher the value of rotor temperature Tr, the greater is the extent to which the duty ratio DUTYmax must be reduced, and conversely the lower the value of Tr the greater can be the DUTYmax. In that way, the maximum amount of electric power can be generated by the synchronous machine, consistent with the permissible range of values of rotor temperature Tr. This operation is illustrated in the flow diagram of FIG. 12.

Third Embodiment

Figure 13:
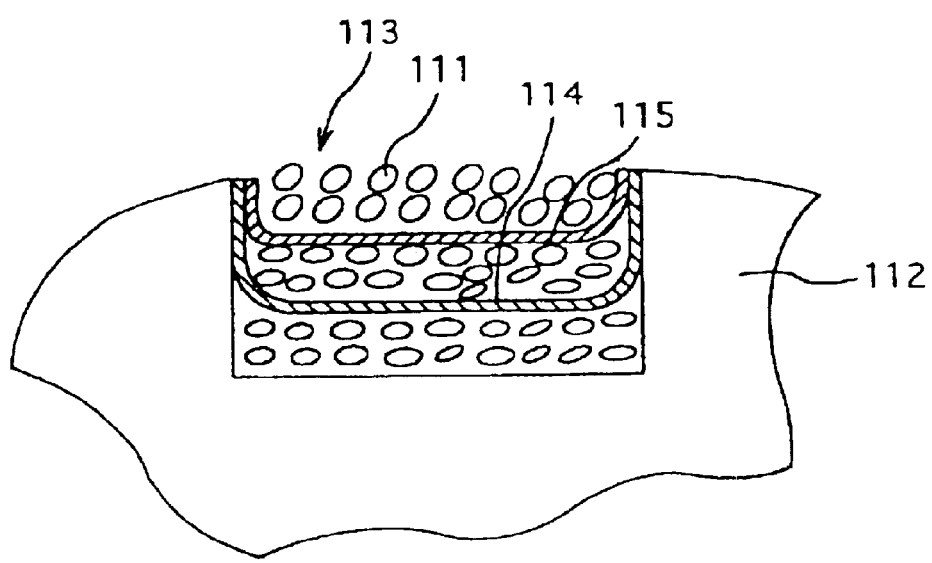
FIG. 13 is a partial cross-sectional view of the rotor of a synchronous machine of a third embodiment, which has the general configuration shown in FIG. 5.

A third embodiment will be described referring to FIG. 13. The overall configuration of the vehicle motor-generator apparatus can be as described for either of the preceding embodiments, so that detailed description will be omitted.

As can be understood from the description of the preceding embodiment, it is important to have a large value of thermal capacity Q of the rotor of a field winding type of synchronous machine which is used as a vehicle motor-generator. However, a large thermal capacity signifies that the rotor must be large in size. An embodiment will be described whereby thermal transfer is increased between the field winding 111 and the armature winding 121, i.e., whereby the temperature differential between these is reduced. The effective thermal capacity of the armature winding 121 can thereby be increased. FIG. 13 is a partial cross-sectional view of the rotor of the synchronous machine of this embodiment. As shown, the field winding 111 is held within a winding accommodation slot 113, which is formed in the outer peripheral face of the rotor core 2120, formed with two opposing mutually parallel faces connected by a lower face.

Copper films 114, 115, are respectively disposed within the field winding 111, each extending substantially in a direction which is parallel to the lower face of the winding accommodation slot 113. In addition, as indicated in FIG. 13, each of these copper films 114, 115 is curved at opposing outer ends thereof, in a direction extending towards the circumference of the rotor core 2120, and terminates at the outer circumferential face of the rotor core 2120.

In that way, heat which is generated within the interior of the field winding 111 is transferred through the copper films 114, 115 to the rotor core 2120 in a highly efficient manner, so that the temperature of the rotor core 2120 can reach a value that is close to the aforementioned maximum permissible temperature Tgmax, while electric power generation is performed. Hence, the thermal capacity of the rotor is effectively increased, so that the field current which is supplied during electric power generation operation of the synchronous machine can be increased.

It will be apparent that this embodiment could of course be used in combination with the second embodiment described above.

Fourth Embodiment

Figure 14:
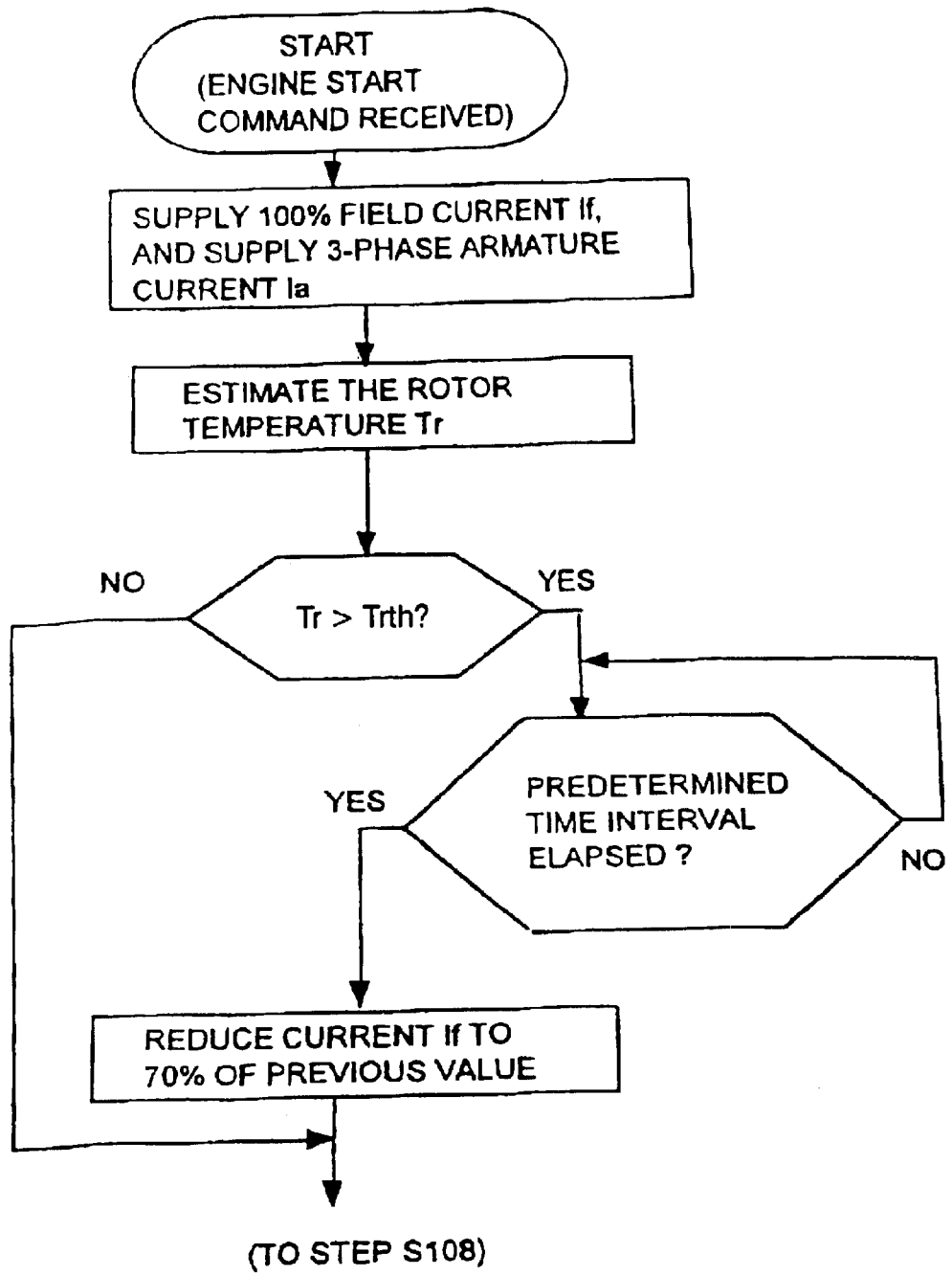
FIG. 14 is a flow diagram showing the control operation applied to the synchronous machine of a fourth embodiment, which has the general configuration shown in FIG. 5.

A fourth embodiment is as follows. This utilizes a method whereby the level of field current is reduced during a predetermined initial part of the engine starting time interval, with the total time for which the field current flows being increased correspondingly. The amount of temperature increase of the field winding 111 that occurs during the engine starting operation can thereby be reduced, while at the same time it is ensured that the engine can be driven to a sufficiently high speed of rotation to achieve starting, and the size of the rotor of the synchronous machine can be reduced. FIG. 14 is a flow diagram of the control operation of this embodiment.

To effect engine starting, the field current of the synchronous machine is first set to a maximum value (by setting the aforementioned duty ratio for supplying the field current, to a maximum value which will be assumed to be 100%), while at the same time an armature current Ia is passed through the armature winding, and the rotor temperature Tr is then estimated as described hereinabove. If the rotor temperature Tr is less than a predetermined temperature threshold value Trth, then the maximum level of field current is supplied until it has been detected that the engine speed of rotation has reached a predetermined value, and the engine starting operation is then terminated (step 106 in FIG. 11).

However if it is judged, at the start of the engine starting operation, that the rotor threshold value temperature Trth is exceeded, then after a predetermined time interval has elapsed from the point of beginning the engine starting operation (with that time interval being assumed to be 0.15 second in this example) the duty ratio of the switching control of supplying the field current is reduced from 100% to a lower value, which will be assumed to be 70%. As a result, the amount of heat that is generated by the field current will be reduced by approximately one half, while the torque applied to drive the engine will be reduced by approximately 30%. This condition is continued until the engine speed of rotation has reached a predetermined value, then the engine starting operation is terminated.

In practice, due to the lowering of the level of field current, the magnetic circuit of the synchronous machine will recover from the magnetic saturation condition, so that the effective reduction in the field magnetic flux caused by the lowering of the field current will be held to approximately 15%, since the field current is utilized more efficiently.

Due to the reduction in the amount of torque produced, the amount of time for which the field current is passed to effect starting of the engine, must be increased by comparison with the case in which the maximum level of field current is continuously supplied throughout the engine starting operation. This increase in the engine starting time duration will result in an increase in the total amount of heat that is generated in the field winding 111, and also an increase in the consumption of energy stored in the vehicle battery. This energy is lost due to the effects of friction, etc., in addition to the energy actually applied to effect rotation of the engine. However if the increase in the time duration for which the field current is passed is held to less than a factor of two, then the overall amount of heat generated in the field winding 111 during the engine starting operation will be sufficiently low (in view of the increased time which is taken to generate that amount of total heat) that the rotor temperature will not reach a level whereby damage to the insulation film of the field winding 111 can occur.

The reason for maintaining the duty ratio for supplying the field current at the maximum value (assumed to be 100% in the above) during an initial short predetermined time interval at the start of the engine starting operation, is to ensure that the maximum level of field current will continue to be supplied at least until the initial effects of static friction have been overcome, and the first compression stroke of the engine has been completed, i.e., so that maximum torque is supplied when it is most necessary, during the initial peak in the level of required torque.

Fifth Embodiment

Figure 15:
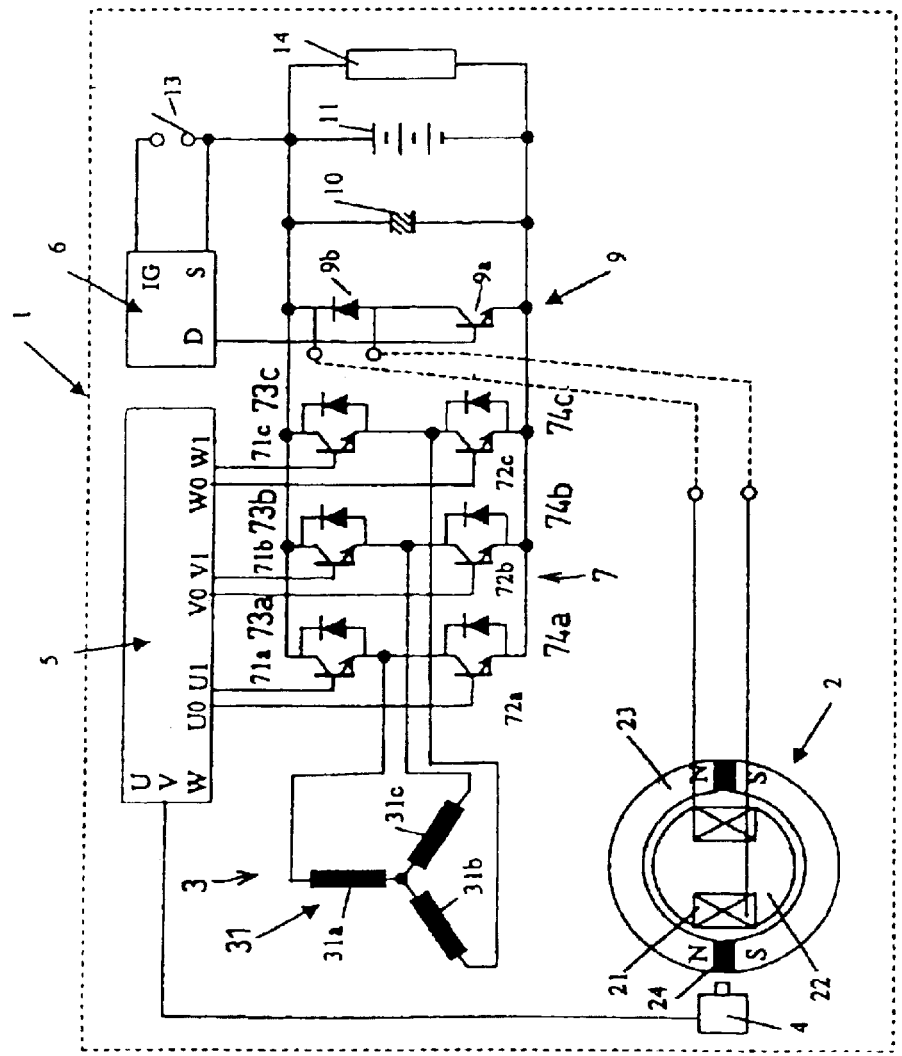
FIG. 15 is a diagram conceptually illustrating the overall configuration of a fifth embodiment of a vehicle motor-generator apparatus based on a synchronous machine.
Figure 16:
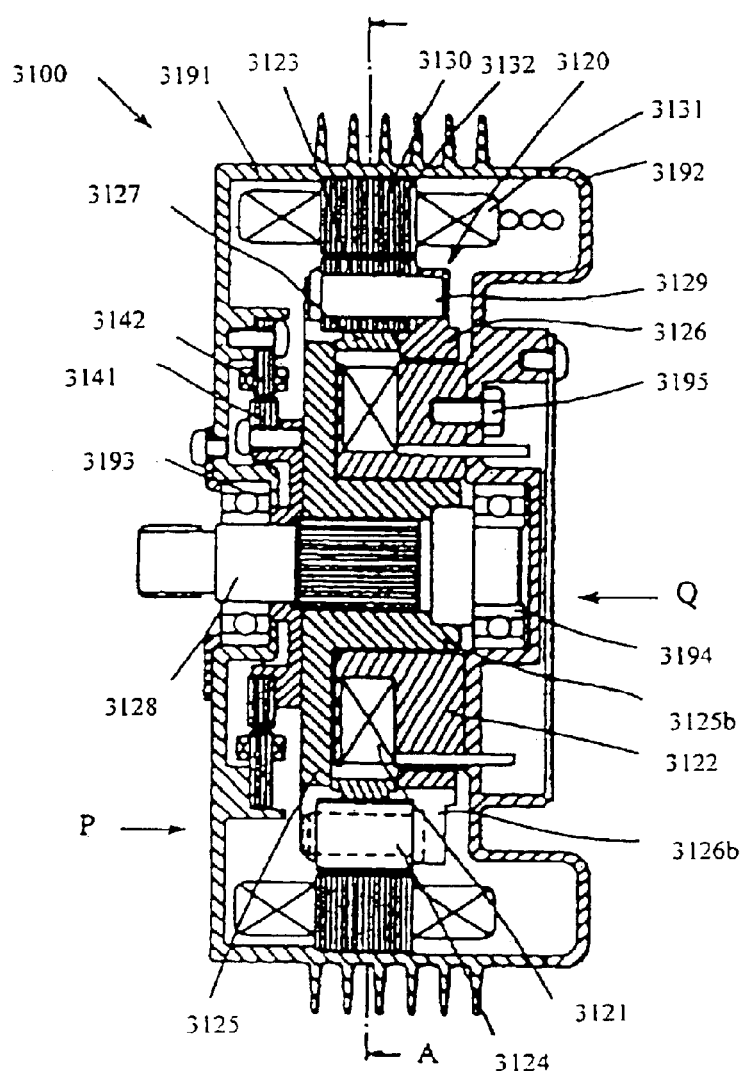
FIG. 16 is a cross-sectional view of the synchronous machine of FIG. 15, taken in a plane oriented along the rotor axis direction.

FIG. 15 shows the overall configuration of a fifth embodiment of a vehicle generator apparatus according to the present invention. This embodiment will be described only in relation to operation of the apparatus in the electric power generating mode. The vehicle motor generator apparatus 1 is based on a field winding type of synchronous machine having a rotor 2 and a stator 3, a rotation position sensor 4, a phase control circuit 5, a field current control circuit 6, an inverter 7, a field current supply circuit 9, and a smoothing capacitor 10.

The rotor 2 is shown in conceptual form in FIG. 15, having a field winding 21 which is wound on a rotor yoke 22, a rotor core 23 positioned on the external periphery of the rotor yoke 22, permanent magnets 24 which are fixedly attached to the rotor core 23. As described hereinafter, the rotor core 23 rotates within a stator core, and has a rotary yoke member which rotates integrally with the rotor core 23. A field core which is fixed to the housing has a field winding 21 wound thereon.

The stator 3 has a 3-phase armature winding 31 wound on a stator core. The armature winding 31 is formed of three phase winding 31*a*, 31*b* and 31*c*.

The phase control circuit 5 performs switching control of six transistors within the inverter 7 as described hereinafter, based on an output signal from the rotation position sensor 4, to control the phase and amplitude of the stator current which flows in the armature winding 31.

The field current control circuit 6 controls the field current supply circuit 9 in accordance with the voltage of the battery 11, to thereby control the field current that is supplied to the field winding 21. In addition, the field current control circuit 6 has an S terminal through which the voltage of the battery 11 is detected, an IG terminal which is connected via the vehicle ignition switch to the battery 11, and a D terminal that is connected to the transistor 9*a* of the field current supply circuit 9.

The inverter 7 is a 3-phase AC-to-DC and DC-to-AC power converter, having a full-wave rectifier circuit formed of six diodes 73*a*, 74*a*, 73*b*, 74*b*, 73*c*, 74*c*, and having power MOS transistors 71*a*, 72*a*, 71*b*, 72*b*, 72*c*, 72*c* respectively connected in parallel with corresponding ones of these diodes. The three AC terminals of the inverter 7 are connected to the respective phase windings 31*a*, 31*b* and 31*c* of the armature winding 31 of the synchronous machine. The inverter 7 is connected to a battery 11.

The field current supply circuit 9 consists of a transistor 9*a*, which is connected in series with the field winding 21 and is controlled to perform periodic interruption of the DC field current that is supplied from the battery 11 to the field winding 21 of the synchronous machine, to thereby control the effective level of the field current, and a diode 9*b* which is connected in parallel with the field winding 21.

The smoothing capacitor smoothes the output voltage that is produced from the inverter 7 and supplied to the battery 11. The battery 11 supplies power to the vehicle load 14.

The field winding 21 is supplied with field current from the field current supply circuit 9, whereby a magnetic field is formed in the external circumferential face of the rotor core 23. As a result of rotation of the rotor core 23 (in the counterclockwise direction as seen in FIG. 15) by the vehicle engine (not shown in the drawings), phase voltages which respectively differ by electrical angles of 120° are produced in the phase leads 31*a*, 31*b*, 31*c*.

The actual physical configuration of the synchronous machine of this embodiment will be described in the following, referring to FIGS. 16 to 19. As shown, the synchronous machine 3100 has a rotor 3120, corresponding to the rotor 2 in FIG. 15, and a stator 3130, corresponding to the stator 3 in FIG. 15. The stator 3130 is fixedly attached to respective circumferential inner faces of a front frame 3191 and an end frame 3192.

The rotor 3120 is supported in the front frame 3191 and an end frame 3192 by bearings 3193, 3194, with an air gap provided between the inner periphery of the stator 3130 and the outer periphery of the rotor 3120. A resolver rotor 3141 functions to detect the angular position of the rotor 3120, in conjunction with a corresponding resolver stator 3142.

The stator 5130 has a cylindrical stator core 3132 formed of plates of electromagnetic material stacked along the axial direction, with a 3-phase armature winding 3131 (corresponding to the armature winding 31 of FIG. 15) wound thereon.

The rotor 3120 is formed of a rotor core 3123, permanent magnets 3124, pins (formed of a soft magnetic material and respectively configured to function as magnetic shunt members) 3129, and rotor yokes 3125, 3126, and operates in conjunction with a field core 3122 (which is a stationary field core, fixedly attached to the end frames), and spacer 3127.

Figure 17:
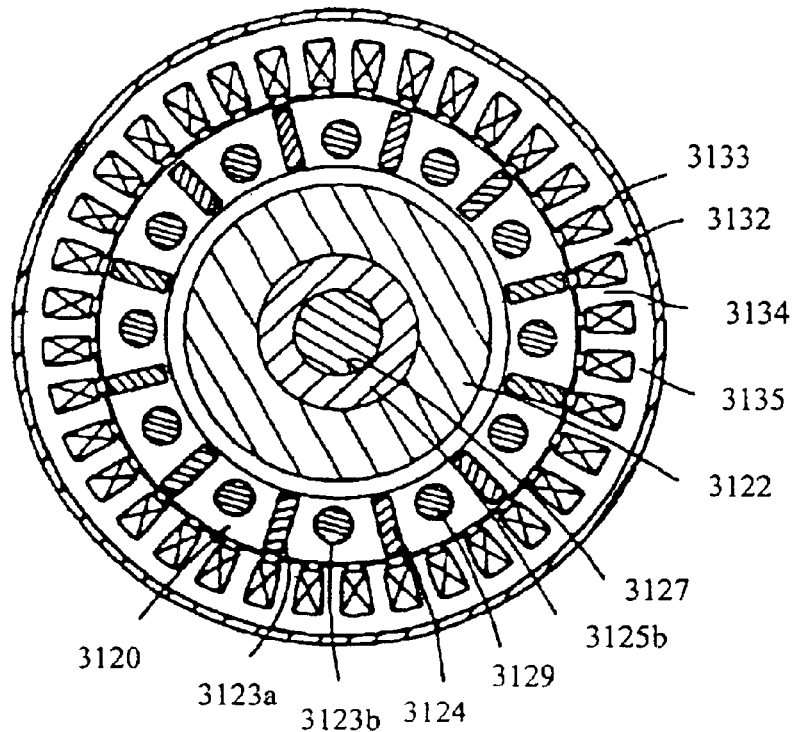
FIG. 17 is a cross-sectional view corresponding to FIG. 16, taken in a plane perpendicular to the rotor axis direction, as indicated by arrows A-A.

FIG. 17 is a cross-sectional view taken through line A-A in the direction indicated by the arrows, i.e., in a plane at right angles to the rotational axis. The rotor core 3123 is formed with a cylindrical shape, by stacking a large number of disk-shaped plates of soft magnetic material along the axial direction. In addition, the rotor core 3123 has n magnet accommodation apertures 3123 (where n is an even integer) formed around the circumference thereof at equidistant spacings, each extending along the axial direction. Round apertures 3123*b* are formed between respective pairs of the magnet accommodation apertures 3123*a*, with each aperture 3123*b* being positioned at a circumferential central position between a pair of magnet accommodation apertures 3123*a*. The permanent magnets 3124 are fitted into respective ones of the magnet accommodation apertures 3123*a*, with the polarities of the permanent magnets 3124 (at the periphery of the rotor core) arranged to successively alternate around the circumferential direction.

Figure 18:
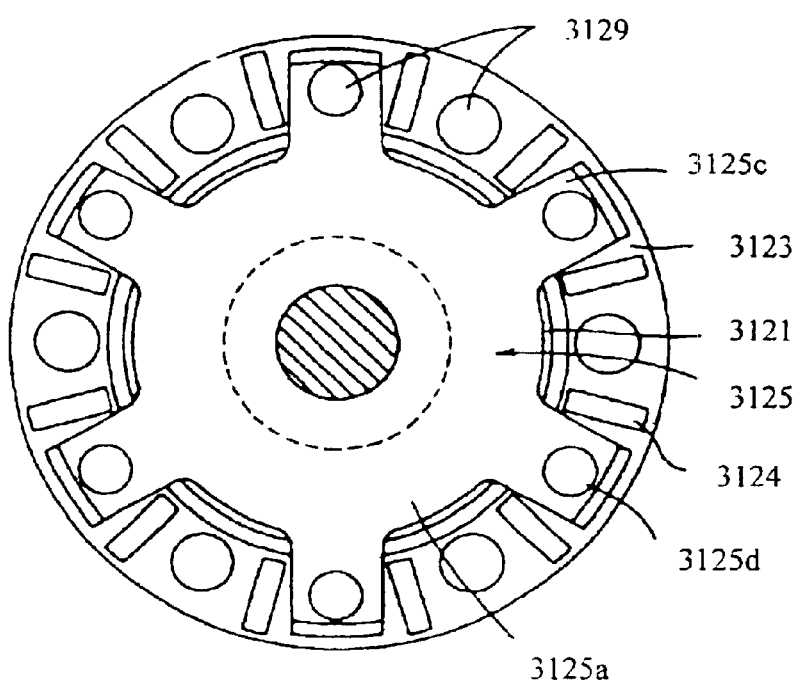
FIG. 18 is a cross-sectional view corresponding to FIG. 16, taken in a plane perpendicular to the rotor axis direction, viewed in the direction indicated by the arrow P.

FIG. 18 is an external view of the rotor 3120, as viewed from the direction indicated by the arrow P. The first rotor yoke 3125 is formed of an annular portion 3125*a*, a boss 3125*b*, and a total of n/2 ribs 3125*c* which extend in the radial direction from the annular portion 3125*a*. Respective round apertures 3125*d* are formed in the ribs 3125*c*, with odd-numbered ones (as counted around the circumferential direction) of the pins 3129 being inserted into respective ones of these round apertures 3125*d*, to thereby mutually attach the rotor core 3123 and the first rotor yoke 3125 as an integral body.

Figure 19:
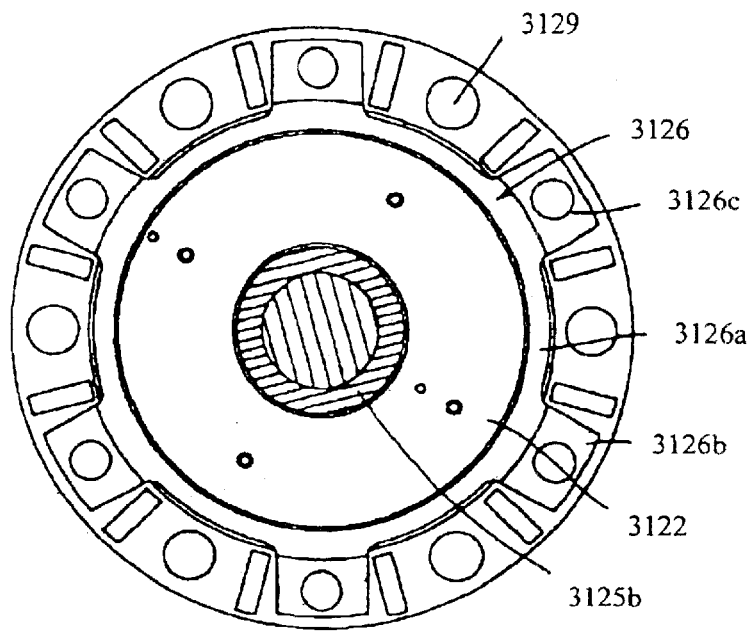
FIG. 19 is a cross-sectional view corresponding to FIG. 16, taken in a plane perpendicular to the rotor axis direction, viewed in the direction indicated by the arrow Q.

FIG. 19 is an external view of the rotor 3120, viewed in the direction indicated by the arrow Q. The second rotor yoke 3126 is formed of an annular member 3126*a*, and a total of n/2 ribs 3126*b* which extend in the radial direction from the outer periphery of the annular member 3126*a*. Respective round apertures 3126*c* are formed in the ribs 3126*b*, with the even-numbered ones (as counted around the circumferential direction) of the pins 3129 being inserted into respective ones of these round apertures 3126*c*, to thereby mutually attach the rotor core 3123 and the second rotor yoke 3126 as an integral body. In that way, the rotor core 3123, the first rotor yoke 3125 and the second rotor yoke 3126 are mutually attached as an integral body.

The spacer 3127 is a ring formed of a non-magnetic material, disposed at the inner periphery of the rotor core 3123, enclosed between the first rotor yoke 3125 and the second rotor yoke 3126.

A shaft 3128 is press-fitted onto the first rotor yoke 3125 such as to prevent relative rotational motion between them. The field core 3122 is flange-shaped and is formed of a soft magnetic material, and has a disk-shaped part that is fixedly attached by screws 3195 to a side wall of the end frame 3192. The field core 3122 is with a small air gap between its inner peripheral face and the outer peripheral face of the boss 3125*b* of the first rotor yoke 3125, so that relative rotational motion between the field core 3122 and the first rotor yoke 3125 is enabled. The field core 3122 is inserted in the axial direction into a space which is provided in the interior of the rotor core 3123. An external circumferential face at the rear side of the field core 3122 is spaced apart from an inner circumferential face of the second rotor yoke 3126 by a small air gap. A boss portion of the field core 3122 has the field winding 3121 wound thereon.

The stator 3130 is formed of a 3-phase armature winding 3131 and the stator core 3132 which is formed of stacked plates of soft magnetic material. The stator core 3132 is formed with a slot 3133 formed therein into which is inserted the 3-phase armature winding 3131, a dais 3134 and a core back 3135.

The permanent magnets 3124 inserted into the rotor core 3123 are disposed such that the N and S magnetic poles are positioned in successive alternation, with fixed pitch, around the circumference of the rotor core 3123. The magnetic flux of an N-pole is by-passed through a magnetic shunt path which extends from the N-pole side of a pin 3129, through the first rotor yoke 3125, the field core 3122, the second rotor yoke 3126, and back to the S-pole side of that pin 3129, to thereby return to the corresponding S-pole. As a result of this magnetic shunt path, there is a corresponding reduction in the amount of the magnetic flux of a permanent magnet 3124 that flows into the stator 3130.

When field current flows in the field winding 3121, the magnetic field that is produced by that current flow will act in the opposite direction to the magnetic flux of the permanent magnets 3124, so that the permanent magnet flux will flow into the stator 3130 together with the magnetic flux produced by the current flow in the field winding 3121. Hence, when the rotor is rotated, electric power generation occurs as voltage is induced in the armature winding 3131 by motion of that winding through these magnetic fields.

The phase of the induced voltage of the armature winding 3131 is detected based on the operation of the rotation position sensor 4 for detecting the rotor position, and the phase control circuit 5 performs switching control of the power MOS transistors 71*a*, 72*a*, 71*b*, 72*b*, 71*c*, 72*c* of the voltage application circuit 7, to apply AC voltages which result in current flows in the armature winding 3131 which have a specific degree of electrical angle of phase difference with respect to the induced AC voltages of the armature winding 3131. As a result, as described hereinabove and as is well known, the generated output electric power can thereby be substantially increased. It is further known in the prior art that the greatest effect in achieving increased electric power generation can be obtained if the phase difference is a delay of approximately 90 degrees.

Figure 20:
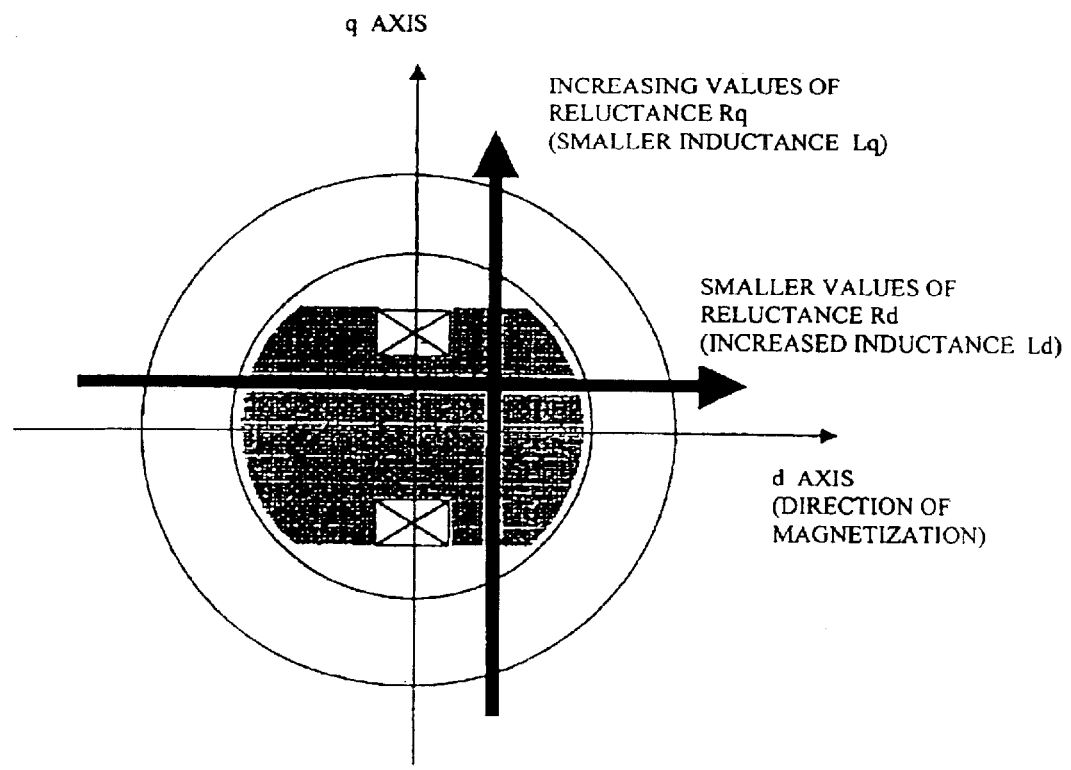
FIG. 20 is a diagram for conceptually illustrating magnetic reluctance relationships within a prior art field winding type of synchronous machine, as viewed in a plane perpendicular to the rotational axis.

However with the above embodiment of the present invention, additional advantages are obtained as described in the following. With the rotor of a prior art type of synchronous machine as shown in FIG. 20, the gap between the rotor core and the stator core is small, with respect to the direction of the magnetic flux that is produced by the armature winding. As a result, the magnetic reluctance with respect to the direction of that magnetic flux is small (so that the direct-axis inductance Ld of the armature winding is large). On the other hand, the aforementioned gap is large, with respect to the direction that is at right angles to the field magnetic flux (so that the quadrature-axis inductance Lq of the armature winding is small).

Figure 21:
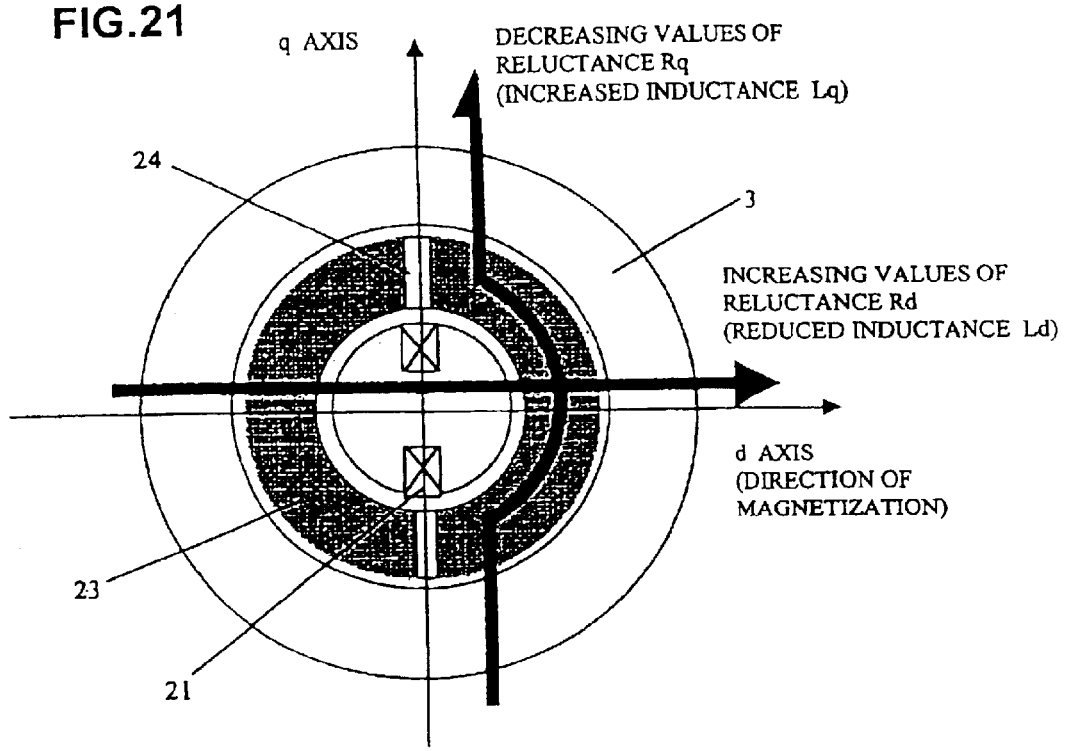
FIG. 21 is a diagram for conceptually illustrating magnetic reluctance relationships within the synchronous machine of the fifth embodiment, as viewed in a plane perpendicular to the rotational axis.

However with the present invention as illustrated in FIG. 21, since there is an air gap between the rotor core 23 and the rotor yoke 22 having the field winding 21 wound thereon, the magnetic reluctance with respect to magnetic flux in the direction generated by the armature winding is large (so that the direct-axis inductance Ld of the armature winding is small). Conversely, leakage of magnetic flux in a direction at right angles to that of the armature current-induced magnetic flux is suppressed by the action of the permanent magnets. Thus, the core width can be made large, and hence the quadrature-axis inductance Lq can be made small.

Figure 22:
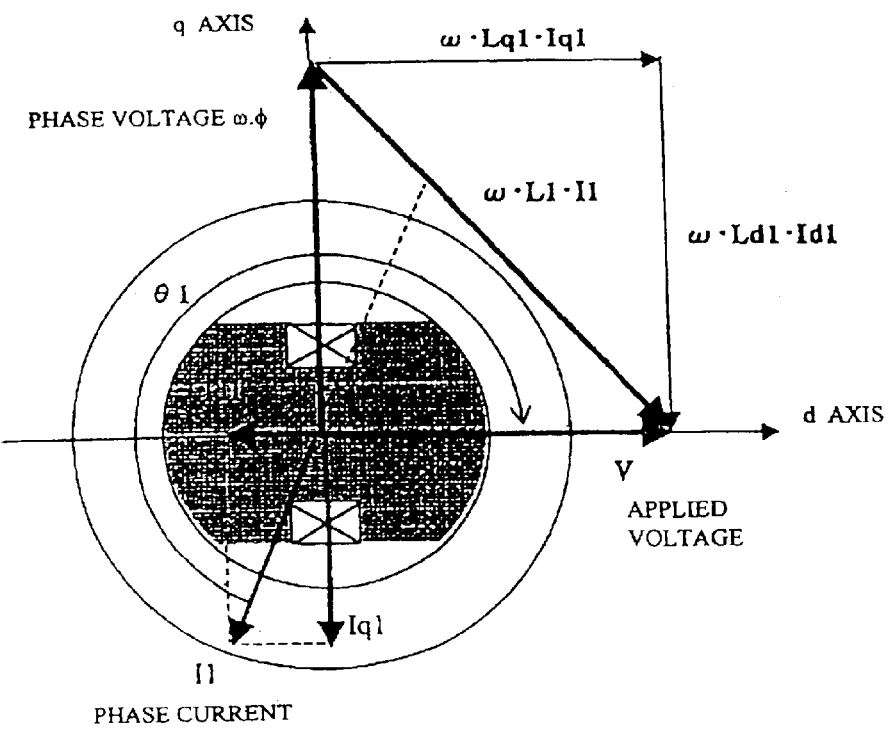
FIG. 22 is a diagram illustrating the torque characteristics of a prior art field winding type of synchronous machine.
Figure 23:
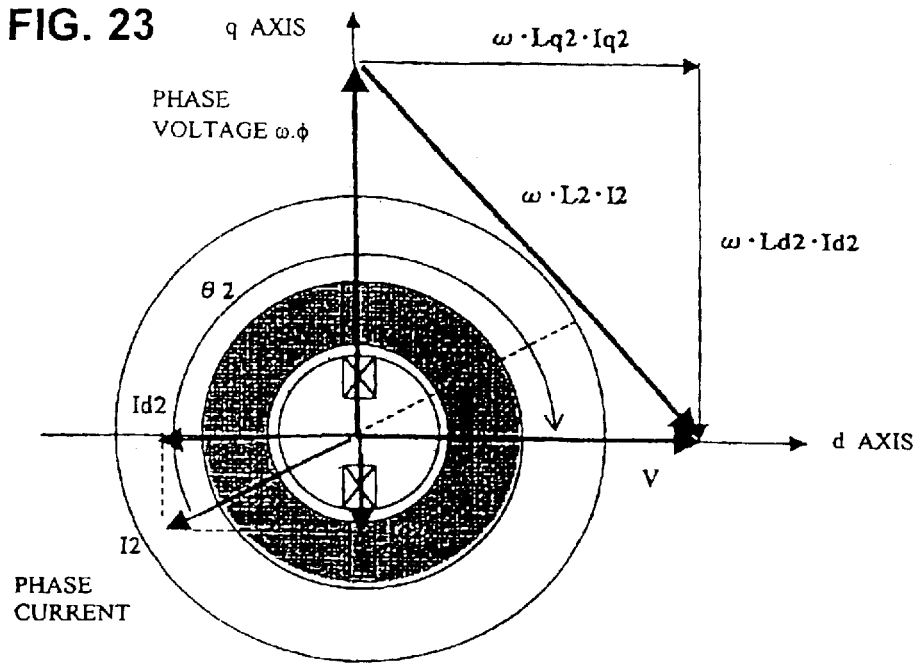
FIG. 23 is a diagram illustrating the torque characteristics of the synchronous machine of the fifth embodiment.

FIGS. 22 and 23 are vector diagrams which illustrate the case of a prior art type of synchronous machine, with electric power being generated using a value of 90° for the aforementioned phase delay angle.

The power factor reaches its maximum value when the power factor phase q is 180°, i.e., when all of the armature current becomes available as electric power current. Hence the power factor angle should be as close as possible to 180°. With the prior art type of synchronous machine of FIG. 22, since the inductance value Lq1<Ld1, the armature current I1 has a phase vector which differs by the power factor angle q1 from the phase vector of the induced voltage V.

However with the above embodiment of the present invention as illustrated in FIG. 23, since Lq2>Ld2, the phase of the armature current I2 which flows in this case differs from that of the induced voltage V by the power factor angle q2, where the relation exists:

$$180 < q2 < q1$$

Since the generated electric power is expressed as (3.V.I. cos q), it can be understood that the invention enables an increase in the amount of generated electric power, by comparison with prior art types of such an apparatus. Hence the invention enables a vehicle motor-generator apparatus based on a field winding type of synchronous machine to achieve a higher performance when operating in the electric power generating mode.

Sixth Embodiment

A sixth embodiment of the invention, which is a vehicle motor-generator apparatus based on a combination permanent magnet and field winding synchronous machine of magnetic shunt type, will be described referring to FIGS. 24 to 27. Here, a synchronous machine 5000 has a stator 5100, and a rotor 5200. The stator 5100 is attached to respective inner peripheral faces of a front frame 5910 and an end frame 5911. The rotor 5200 is supported in the front frame 5910 and the end frame 5911 by bearings 5920, 5921, with an air gap between the outer periphery of the rotor 5200 and the inner periphery of the stator 5100. A resolver rotor 5930 serves to detect the angular position of the rotor 5200, in conjunction with a corresponding resolver stator 5931.

The stator 5100 has a stator core 5120 of cylindrical form, formed by stacking electromagnetic iron plates, and a 3-phase armature winding 5110.

The rotor 5200 has a rotor core 5210, permanent magnets 5280, pins 5281 which function as magnetic pole shunt members, rotor yokes 5270 and 5275, a field yoke 5282, and spacer 5290.

Figure 25:
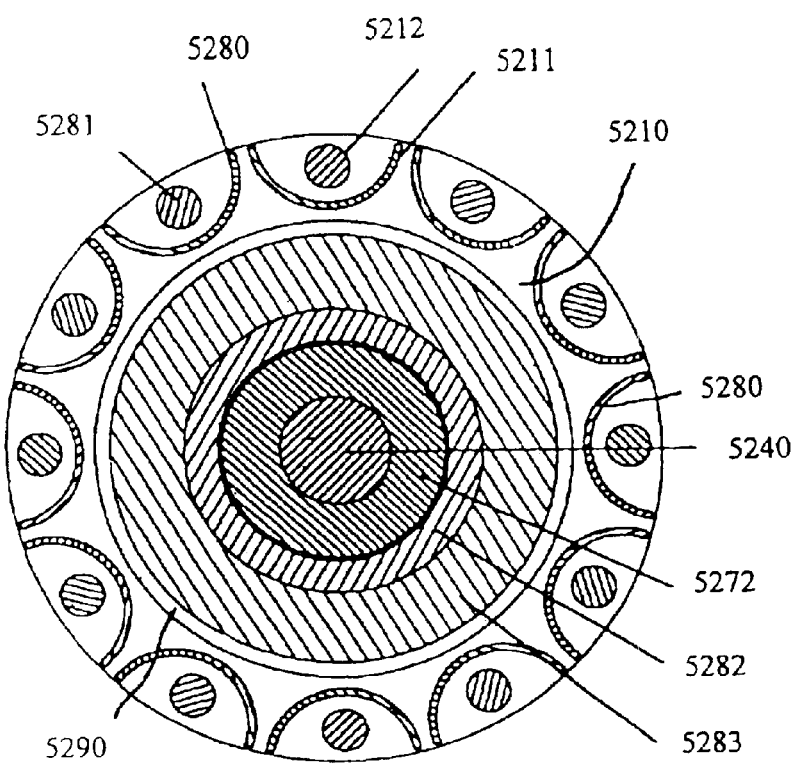
FIG. 25 is a cross-sectional view of the first embodiment, in a plane extending in the radial direction which contains the arrow line A-A shown in FIG. 24.

As shown in FIG. 25, the rotor core 5210 is formed in a cylindrical shape by stacking a large number of disk-shaped electromagnetic iron plates along the axial direction. The rotor core 5210 also has magnet accommodation apertures 5211 each extending along the axial direction and disposed with a fixed peripheral pitch, with each of the magnet accommodation apertures 5211 having a central portion which curves radially inward. The rotor core 5210 further includes round apertures (magnetic shunt member accommodation apertures) 5212 each extending along the axial direction and disposed radially outward from the magnet accommodation apertures 5211. The circumferentially central positions of the magnet accommodation apertures 5211 coincide with respective ones of the circumferentially central positions of the shunt member accommodation apertures 5212.

The permanent magnets 5280 are inserted into the magnet accommodation apertures 5211, and the pins 5281, which are formed of a magnetically soft material and serve as magnetic shunt members, are press-fitted in the axial direction into respective ones of the round apertures 5212. Each of the permanent magnets 5280 is magnetized along the direction of its thickness, i.e., along the radial direction with respect to the rotational axis of the rotor, with the permanent magnets 5280 arranged such that each pair of mutually adjacent poles are of opposing polarities.

Figure 24:
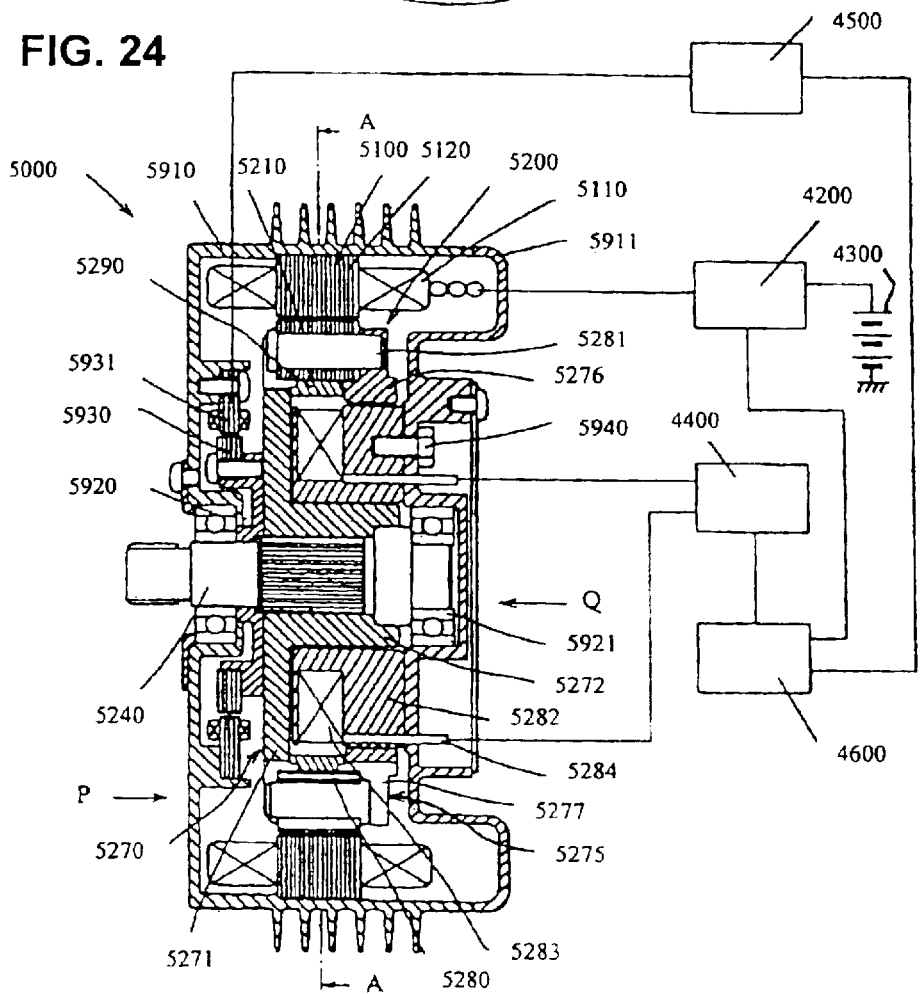
FIG. 24 shows the overall configuration of a sixth embodiment of a field winding type of synchronous machine.
Figure 26:
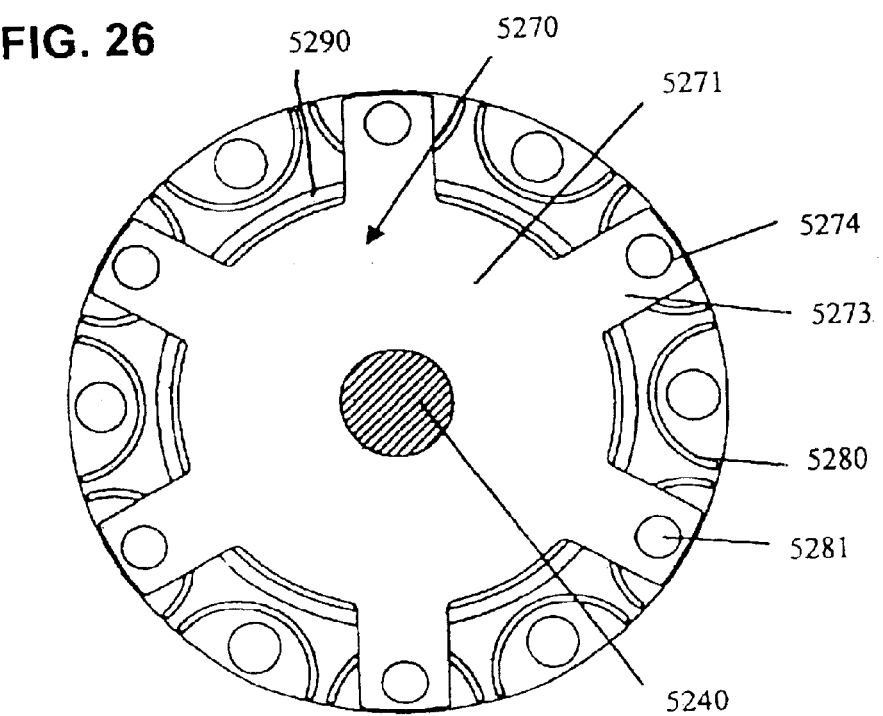
FIG. 26 is a cross-sectional view, in a plane extending in the radial direction, as seen from the direction of the arrow P shown in FIG. 24.

The rotor yoke 5270, shown in FIG. 24 and in the cross-sectional diagram of FIG. 26 which is a view in the direction indicated by arrow P in FIG. 24, includes a first rotor yoke 5270 which has been formed by machining a soft magnetic iron core. The first rotor yoke 5270 has a radially extending disk portion 5271, and a boss 5272 which extends to the rear from the inner periphery of the disk member 5271 to form a flange. The disk portion 5271 has a plurality of ribs 5273, with the number of these ribs being one half of the number of magnet accommodation apertures 5211, with these ribs extending radially outward from the periphery of the disk portion 5271.

Each of the ribs 5273 has a round aperture 5274 formed therein, with these apertures being formed at the same radial positions as the odd-numbered ones (counting in the circumferential direction) of the round apertures 5212 which are shown in FIG. 25. The pins 5281, which pass through the round apertures 5212 in the rotor core 5210, are press-fitted into the odd-numbered ones (counting in the circumferential direction) of the round apertures 5274. The rotor core 5210 is thereby fixedly attached to the first rotor yoke 5270.

Figure 27:
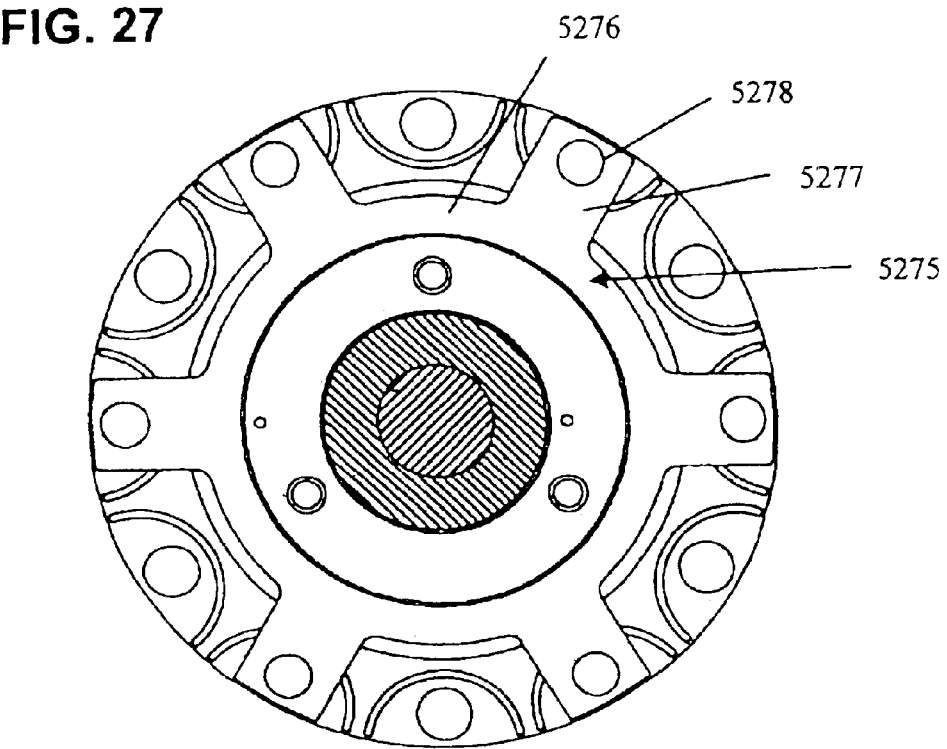
FIG. 27 is a cross-sectional view, in a plane extending in the radial direction, as seen from the direction of the arrow Q shown in FIG. 24.

The second second rotor yoke 5275 is shown in the cross-sectional view of FIG. 27, which is seen from the direction indicated by the arrow view Q in FIG. 24, and is formed from a soft magnetic iron core material. The second rotor yoke 5275 has a radially extending disk portion 5276, with ribs 5277 (whose number is one half of the number of the magnet accommodation apertures 5211) extending radially outward from the periphery of the disk member 5276. Each of the ribs 5273 has a round aperture 5274 formed therein, with these apertures being formed at the same radial positions as the even-numbered ones (counting in the circumferential direction) of the round apertures 5212. The pins (i.e., magnetic shunt members) 5281 which pass through the even-numbered apertures 5212 in the rotor core 5210 are press-fitted into corresponding apertures 5278 of the ribs 5277. The rotor core 5210 and second rotor yoke 5275 are thereby mutually fixedly attached to form a single body.

The spacer 5290, formed of a non-magnetic material, is of tubular shape and disposed at the inner periphery of the rotor core 5210, extending in the axial direction of the second rotor yoke 5275 and the first rotor yoke 5270. A shaft 5240 is fixedly attached to the boss 5272 by being press-fitted thereon. The field core 5282 is flange-shaped formed of a soft magnetic material, and is fixedly attached by screws 5940 to a side wall of the end frame 5911. The inner peripheral face of a boss portion of the field core 5282 is positioned with a fixed air gap between it and the outer peripheral face of the boss 5272 of the first rotor yoke 5270, so that relative rotational motion between the field core 5282 and the rotor is enabled. The boss of the field core 5282 extends into a space provided in the interior of the rotor core 5210.

The external peripheral face at the rear side of the field core 5282 is disposed opposing the inner peripheral face of the rotor yoke 5275, with a small air gap between them.

The boss of the field core 5282 has the field winding 5283 formed thereon. Leads 5284 supply electric power to the field winding 5283 from the exterior.

In the following, the operating principles of this embodiment will be described first for the case of operation of the synchronous machine in the electric motor mode. The 3-phase winding 5110 of the synchronous machine 5000 receives electric power via the inverter 4200 from the battery 4300. The field current which flows in the field winding 5283 is supplied from a field current control circuit 4400 via the leads 5284. The stator 5931 of the resolver supplies an output signal to the signal processing circuit 4500, and the inverter 4200, the field current control circuit 4400 and the signal processing circuit 4500 are controlled by the control circuit 4600.

Description of Magnetic Circuit

The magnetic field formed by the permanent magnets 5280 and the electromagnetic field that is formed by current flow in the field winding 5283 are as follows.

As described above, the permanent magnets 5280 are mounted such that the polarities around the periphery of the rotor core periodically alternate between the S and N poles. The effective magnetic flux from the N and S poles links via the air gap to the stator core 5120 through the field winding 5110 into the stator core 5120, and returns via the air gap to the rotor core 5210. In addition, the magnetic flux from the N pole of a permanent magnet 5280 passes through a pin (i.e., magnetic shunt member) 5281 at an N pole region of the rotor core 5210, through a rib portion 5273 of the first rotor yoke 5270, the disk portion 5271, the boss 5272, the boss of the field core 5282, the air gap, the second rotor yoke 5275, and a pin 5281 at an S pole region, magnet, to thereby return to the N pole of that permanent magnet 5280. A magnetic path shunt is thereby formed. Hence, the effective amount of magnetic flux which flows in the magnetic circuit that links the stator 5100 and the armature winding 5110 is substantially reduced.

Figure 31:
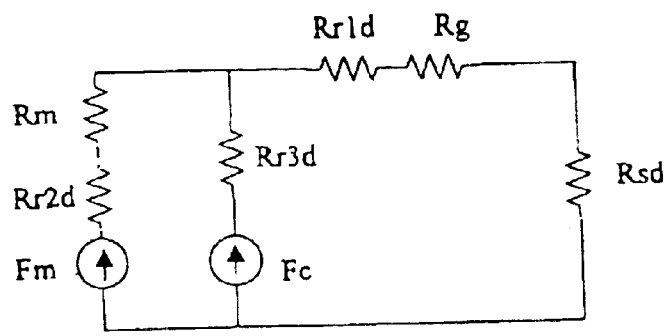
FIG. 31 shows the equivalent magnetic circuit of the magnetic flux path in the field flux direction, for the synchronous machine of the sixth embodiment.

The magnetic flux shunt path described above links with the field winding 5283, so that control of the level of current which is passed through the field winding 5283 can be used to control the amount of magnetic flux which passes through that magnetic flux shunt path, i.e., an amount of by-pass magnetic flux. FIG. 31 shows an equivalent magnetic circuit of this synchronous machine.

The magnetic reluctance of the armature winding 5100 will be designated as Rsd, that of the air gap as Rg, and the magnetic reluctance of a permanent magnet 5280 as Rm. Rr1d, Rr2d and Rr3d designate the respective magnetic reluctances of the pole portion of the rotor core 5210, the radially inward portion of the permanent magnets 5280, and the magnetic shunt path, i.e., the respective values of magnetic reluctance when magnetic flux flows through the rotor side of the magnetic circuit. Designating the magnetizing force of a permanent magnet as Fm, that of the field winding as Fc, the effective amount of magnetic flux fd which flows in the stator 5100 side is given by the following equation:

$$fd=((Rm+Rr2d)Fc+Rr3d(Fm+Rr2d))/(Rr3d(Rm+Rr2d)+(Rm+Rr2d)(Rg+Rr1d+Rsd)+(Rg+Rr1d+Rsd)Rr3d)$$

The effective magnetic flux fd can thus be set to an arbitrary value by setting respective parameters. For example, when no current flows in the field winding 5283 (i.e., Fc=0) then the effective magnetic flux fd0 under that condition is obtained as:

$$fd0=Rr3d(Fm+Rr2d))/(Rr3d(Rm+Rr2d)+(Rm+Rr2d)(Rg+Rr1d+Rsd)+(Rg+Rr1d+Rsd)Rr3d)$$

When the magnetic reluctance Rr of the magnetic shunt path is low, then fd0 is substantially equal to zero. Since that value Rr is based on the magnetic reluctances of the pins 5281, the ribs 5283, the disk-shaped core 5272 and the respective regions of contact of the various components, it is possible to set the value of the effective magnetic flux fd0 to zero, when no current flows through the field winding 5283, by appropriately setting the areas and lengths of the various portions. It will be assumed here that the effective magnetic flux is set in the linear region (i.e., the region from 0 to f' shown in FIG. 32) of the B-H characteristic of the magnetic material constituting the magnetic path, and that the magnetic saturation region of the material constituting the magnetic path is not attained when the effective magnetic flux amount fd0 is zero.

When current is passed through the field winding 5283, the flux amount fdc of the field magnetizing force Fc is formed. The following is then true:

$$fdc=((Rm+Rr2d)Fc/(Rr3d(Rm+Rr2d)+(Rm+Rr2d)(Rg+Rr1d+Rsd)+(Rg+Rr1d+Rsd)Rr3d)$$

Thus as a result, the effective magnetic flux f1 is obtained as:

$$fd=fd0+fdc$$

Hence the effective magnetic flux can be adjusted by adjusting the level of current which flows in the field winding. The above constitutes the magnetic circuit corresponding to the direction of flux which flows in the permanent magnets and the field winding.

Figure 33:
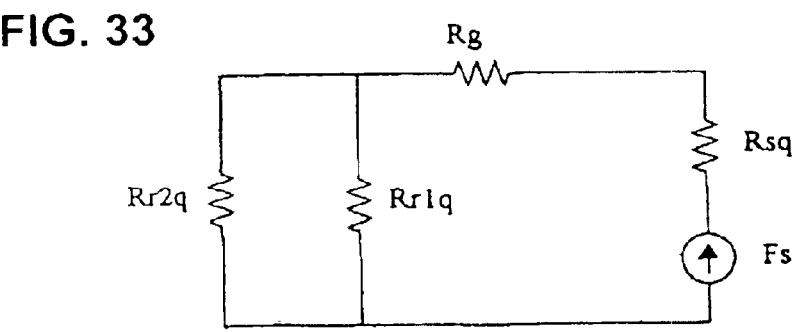
FIG. 33 shows the equivalent magnetic circuit of the magnetic circuit path of field flux in the direct direction.

The magnetic circuit with respect to the flow of magnetic flux having a vector that is at right angles to that of the flux flow of the permanent magnets and the field winding, will be described referring to FIG. 33. The reluctance at the stator 5100 side with respect to that magnetic circuit will be designated as Rsq, and the corresponding reluctance of the air gap as Rg, while the respective rotor-side reluctances of the magnetic pole portion of the 5210 and the radially inward end of each permanent magnet 5280, with respect to that magnetic circuit, will be designated as Rr1q and Rr2q. Designating the magnetizing force of the armature winding as Fs, then the effective magnetic flux amount fq which flows at the stator 5100 side is obtained as:

$$fq=Fs/(Rg+Rsq+((Rr1q.Rr2q)/(Rr1q.Rr2q))$$

If the effective magnetic flux amount is increased by increasing the magnetizing force of the field winding, then saturation will occur for the direct-axis magnetic reluctance Rr1d of the pole portion, and this magnetic saturation will also affect the reluctance R1q. Thus both of these magnetic reluctances will saturate, i.e., each value of reluctance will increase considerably.

However the magnetic flux produced by the permanent magnets 5280 does not flow through the radially inward side portions of the permanent magnets, so that the magnetic reluctance Rr2d is not affected by the level of magnetizing force Fc pf the field winding, and so remains small. Hence for example even if the magnetic reluctance Rr1q reaches saturation, the value of fq will be maintained, by the reluctance Rr2q.

The fact that the value of fq is maintained signifies that the quadrature-axis inductance Lq is increased, and the increase of the magnetic reluctance Rr1d of the pole portion signifies that the direct-axis inductance Ld is reduced.

Under a condition of low speed of rotation, when it is not necessary to produce a weak field, the current passed through the field winding 5283 is increased, so that the effective magnetic flux fd is increased. As a result, the motor torque is obtained as the sum of the product of the effective magnetic flux fd and the torque current (i.e., magnet torque) and the product of the difference between the direct-axis inductance Ld and the quadrature-axis inductance Lq and the square of the current (i.e., the reluctance torque). Thus, by increasing the effective magnetic flux, the current which is passed through the armature winding 5110 can be reduced.

For the reaction voltage to overcome the applied voltage, under a condition of high speed of rotation in which the machine must be driven with weak field control, the current passed through the field winding 5283 is reduced to a low value or to zero, and the permanent magnet magnetic flux path is shunted into the magnetic shunt path, and the weak field current that is passed into the armature winding can be reduced to a low value or to zero. As a result, since the maximum current that flows in the armature winding is reduced, the amount of heat that is generated in the windings is reduced. Hence, the overall scale of the synchronous machine can be reduced. In addition, smaller semiconductor switching devices can be used in the inverter 4200.

Since the copper losses in the field winding 5283 are lower than those in the armature winding 5110, using a weak field that is produced by a field current, as with this embodiment, provides greater efficiency than with a prior art method whereby an armature current is passed to produce the weak field.

With this embodiment, when the field winding magnetizing force Fc is zero, the effective magnetic flux fd at that time is set in the linear region of the B-H characteristic of the magnetic material of the effective magnetic circuit. When it becomes necessary to drive the machine as a motor in the high speed of rotation region, where the reaction voltage resulting from the effective magnetic flux fd is higher than the applied voltage, the armature current supplied to the armature winding 5110 can be reduced to the minimum possible level that is necessary for generating the weak field.

Figure 32:
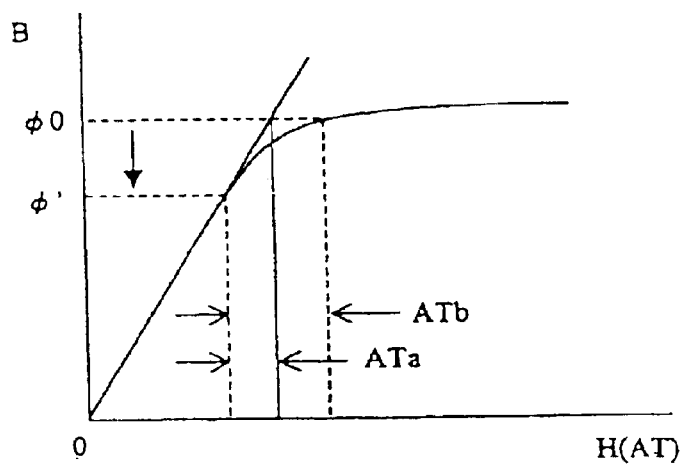
FIG. 32 shows the B-H characteristic of the field magnet circuit path, for the synchronous machine of the sixth embodiment.

As illustrated in more detail in FIG. 32, when the armature current is such that the effective magnetic flux is reduced from f0 to f', then designating the number of ampere turns corresponding to the linear region of the B-H characteristic, designated as ATa, and the number of ampere turns corresponding to the non-linear region as ATb, then since ATa is less than ATb, the armature current can be reduced in proportion to the difference between ATa and ATb.

Figure 34:
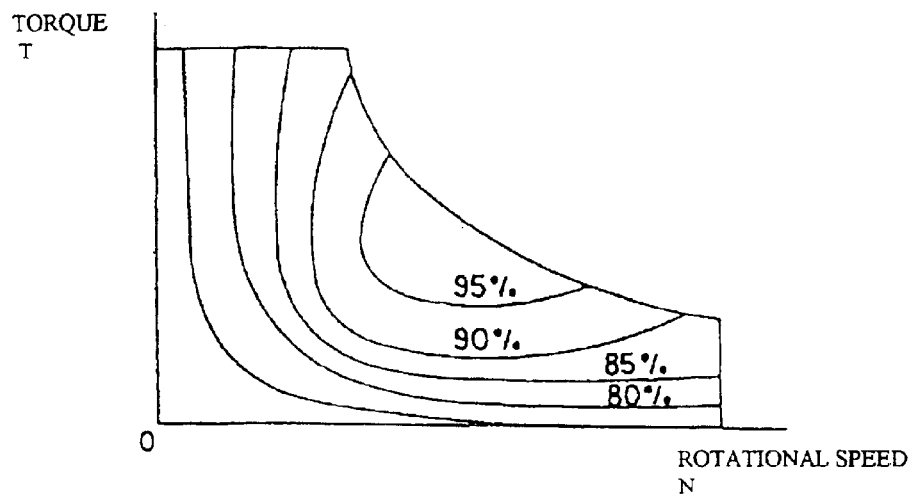
FIG. 34 is a graph for illustrating the efficiency of a prior art type of field type synchronous machine.
Figure 35:
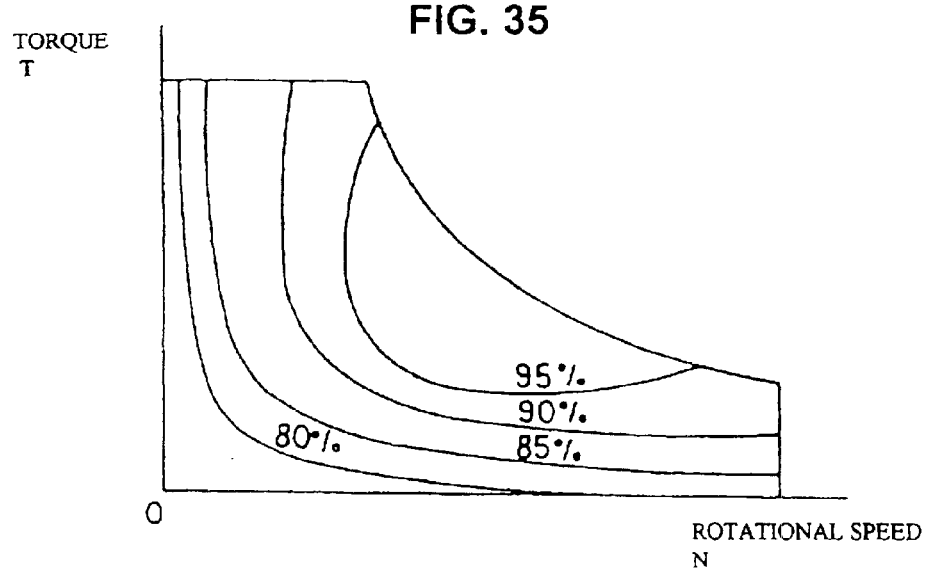
FIG. 35 is a graph for illustrating the efficiency of the synchronous machine of the sixth embodiment.

When a prior art type of permanent magnet synchronous machine is operated as a motor, then when control is performed by passing a weak field current through the armature winding, the efficiency map of the T-N (torque-rotation speed) characteristic is as shown in FIG. 34. With the synchronous machine of this embodiment, when such weak field current control is applied, the resultant efficiency map of the T-N characteristic is as shown in FIG. 35. Comparing FIGS. 34 and 35, it can be understood that the present invention provides an expansion of the efficiency range within the efficiency map.

The above describes the operation of this embodiment with the synchronous machine functioning as a motor. When the synchronous machine of this embodiment is operated as a generator, fd0 is established when the normal vehicle electrical load is being driven. Current is only passed through the field winding when a higher output is required. In that way, the copper losses in the field winding can be reduced and increased efficiency of electric power generation can be achieved.

Furthermore in the prior art, a protruding pole type of synchronous machine is known that is used as a machine which can be controlled through field control from the rotor. However with such a synchronous machine, the effective magnetic flux is obtained only from the field winding. Comparing this with the above embodiment of a synchronous machine according to the present invention, whereby the minimum necessary value of effective magnetic flux is supplemented by magnetic flux from the field winding, the amount of current which must be passed through the field winding with the prior art synchronous machine is greater than for the present invention. Hence with the prior art, the problem exists that the field winding must be made large in scale and that the copper losses in the field winding are large.

Furthermore as described hereinabove, with the above embodiment of the present invention, by providing a magnetic path shunt for the permanent magnets in the rotor core, the quadrature-axis inductance Lq is greater than the direct-axis inductance Ld, so that a high reluctance torque is produced in addition to the magnet torque that results from the effective magnetic flux fd. Hence the torque and the output power can be increased.

Alternative Configuration

Figure 28:
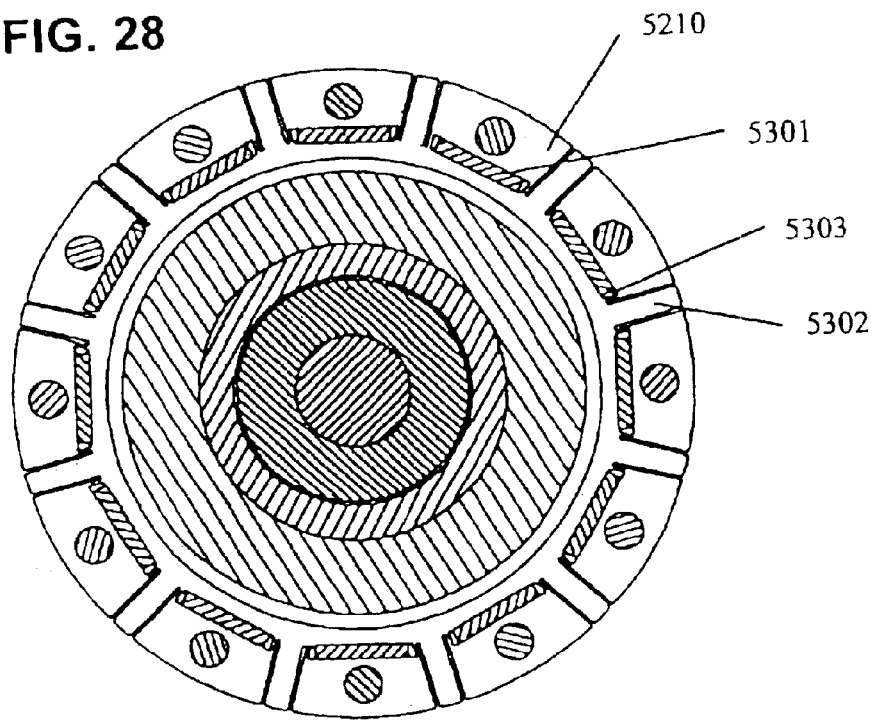
FIG. 28 is a cross-sectional view of an alternative configuration of the rotor of the synchronous machine of the sixth embodiment, taken in a plane extending in the radial direction, as seen from the same direction as for FIG. 25.
Figure 29:
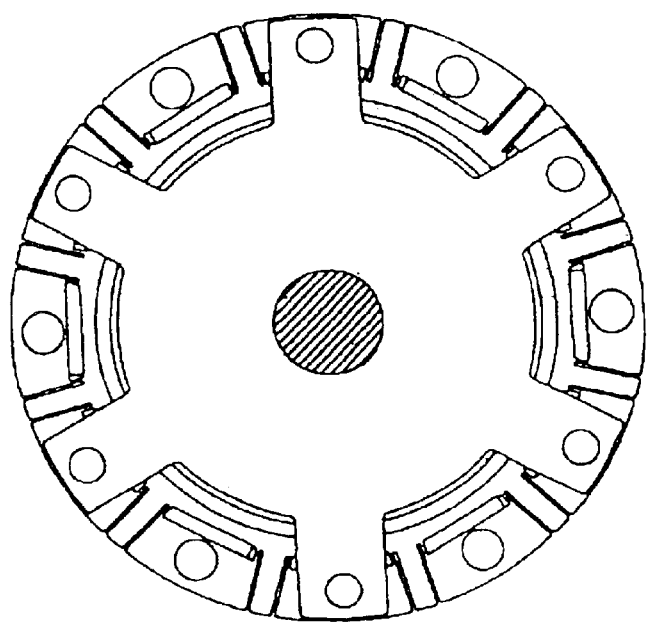
FIG. 29 is a cross-sectional view, in a plane extending in the radial direction, of the alternative configuration as seen from the direction of the arrow P shown in FIG. 24.
Figure 30:
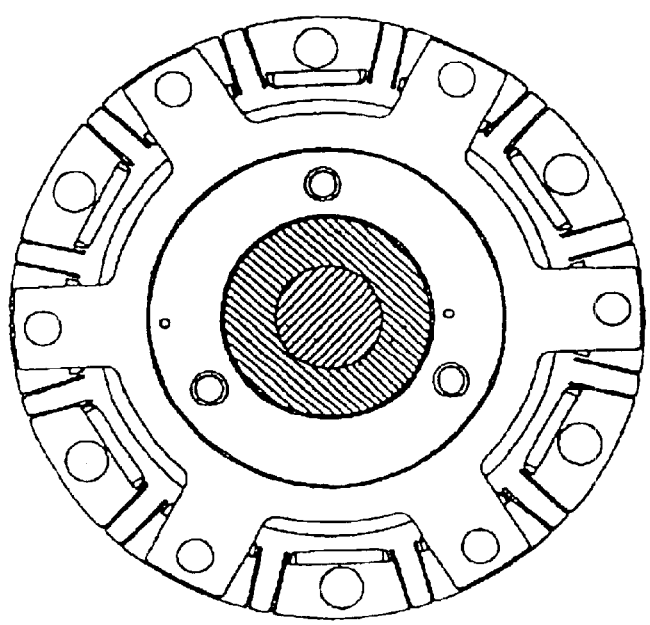
FIG. 30 is a cross-sectional view, in a plane extending in the radial direction, of the alternative configuration as seen from the direction of the arrow Q shown in FIG. 24.

An alternative configuration of the above embodiment is shown in FIGS. 28 to 30. These diagrams respectively correspond to FIGS. 25 to 27 described above, with respect to position relationships in the synchronous machine view of FIG. 24. Overall, the configuration is essentially identical to that of FIGS. 24 to 27. However with the alternative configuration, each of the permanent magnets 5301 has a flat rectangular shape, with a radially protruding pole member 5302 disposed between each pair of mutually adjacent magnet poles as shown. With this configuration, the magnet accommodation apertures are formed as slits in the circumferential face of the rotor core 5210, extending along the axial direction of the rotor core, with the protruding pole members 5302 thereby being formed as shown. Each of the permanent magnets 5301 is magnetized along its thickness direction (i.e., along the radial direction as seen in FIG. 28), and the width of each of the magnet accommodation apertures 5303 is made greater than that of a permanent magnet 5301, to leave spaces at each side of a permanent magnet 5301 (along the circumferential direction) as illustrated in FIGS. 28 to 31) and thereby reduce the amount of flux leakage from the permanent magnets 5301 when these have been inserted in the accommodation apertures 5303.

Other than with respect to the shape of the permanent magnets, the operation and advantages of this alternative configuration are similar to those described hereinabove for the synchronous machine configuration in which permanent magnets of curved shape are utilized, so that detailed description will be omitted.

What is claimed is:

1. A motor-generator apparatus for a vehicle, operable for selective performing starting of an engine of said vehicle and generating electric power while said vehicle is running, having a synchronous type of generator-motor comprising:

a housing, a stator core attached to an inner peripheral face of said housing, an armature winding formed on said stator core, a rotor core of cylindrical form, mounted for rotation within said housing with a predetermined gap between said rotor core and an inner periphery of said stator core, an even number of permanent magnets, respectively retained in an even number of magnet accommodation apertures each formed extending along an axial direction in said stator core, with an even number of field poles produced by said permanent magnets being arranged successively alternating in polarity around the outer circumference of said rotor core, magnetic shunt members inserted in respective magnetic shunt member accommodation apertures extending along said axial direction of the rotor core, for shunting magnetic fields produced by said permanent magnets, a field winding disposed at the inner peripheral face of said rotor core, for producing a magnetic flux within said magnetic shunt members along the axial direction, and a yoke member, disposed at the inner periphery of said rotor core, to form a flow path for the magnetic flux produced by said field winding, in conjunction with said rotor core and said magnetic shunt members;

wherein each of said permanent magnets has a portion thereof disposed radially inward from said magnetic shunt members, and said rotor core has a magnetic path which extends from a region at the outer periphery of said rotor core through a region disposed between two circumferentially adjacent ones of said permanent magnets and to a region which is located radially inward from said permanent magnets.

2. A vehicle motor-generator apparatus as claimed in claim 1, wherein said magnet accommodation apertures are each of arc shape as seen in cross-section in a plane which is at right angles to a rotational axis of said rotor core, with end portions of each of said magnet accommodation apertures extending to the outer periphery of said rotor core and each magnet accommodation aperture having a circumferentially central portion which is disposed radially inward from said end portions thereof, and wherein said permanent magnets are mounted substantially in a depth direction of said magnet accommodation apertures, with a circumferentially central portion of each of said magnet accommodation apertures formed with a concave shape in a circumferential face of said rotor core.

3. A vehicle motor-generator apparatus as claimed in claim 2, wherein respective circumferentially central points of said permanent magnets substantially coincide with circumferentially central points of said magnetic shunt members.

4. A vehicle motor-generator apparatus as claimed in claim 1, wherein the outer periphery of said rotor core has pairs of pole protrusion members, each formed between a pair of slits extending along the axial direction of said rotor core and each disposed between an arbitrary pair of said field poles, with a plurality of said pole protrusion members circumferentially disposed at equal spacings around the periphery of said rotor core.

* * * * *